United States Patent
Takaishi

[11] Patent Number: 6,118,615
[45] Date of Patent: Sep. 12, 2000

[54] APPARATUS FOR POSITIONING HEAD OF MAGNETIC STORAGE DEVICE

[75] Inventor: Kazuhiko Takaishi, Kawasaki, Japan

[73] Assignee: Fujitsu Limited, Kawasaki, Japan

[21] Appl. No.: 08/940,262

[22] Filed: Sep. 30, 1997

[30] Foreign Application Priority Data

Feb. 3, 1997 [JP] Japan .................................. 9-020371

[51] Int. Cl.⁷ ................................................ G11B 5/596
[52] U.S. Cl. .................................. 360/77.02; 360/77.05; 360/77.08; 360/77.04
[58] Field of Search ............................ 360/77.08, 77.05, 360/77.02, 77.04, 75

[56] References Cited

U.S. PATENT DOCUMENTS 5,576,909  11/1996  Dierkes et al. ...................... 360/78.09
5,684,650  11/1997  Kadlec et al. ....................... 360/77.06
5,847,894  12/1998  Blank et al. ........................ 360/77.01

FOREIGN PATENT DOCUMENTS 5174510  7/1993  Japan .
8195044  7/1996  Japan .

*Primary Examiner*—Paul Loomis
*Assistant Examiner*—Dan I. Davidson
*Attorney, Agent, or Firm*—Greer, Burns & Crain, Ltd.

[57] ABSTRACT

An enhancement of the precision of the positioning of the head in a magnetic recording device having a magnetoresistive head is provided. The burst pattern stored in a storage medium is read by the head, and the two triangular waves are demodulated in the demodulation portion through the read/write portion. The actual head position signal generated in the head position signal generation portion is compared in the comparison portion with the target position generated in the target position generation portion. The deviation ΔP as the output is controlled and calculated in the proportional and integral control portion, and the resultant output is compensated with regard to the reading gain difference of the head in the gain difference compensation portion. An arc-sine function transformation is carried out in the linearity compensation portion to compensate for the linearity. The position of the head is adjusted by the voice coil motor based on the signal after the compensation. The gain difference compensation characteristic can be changed during the operation of the magnetic recording device by the gain difference compensation characteristic determination portion.

13 Claims, 24 Drawing Sheets

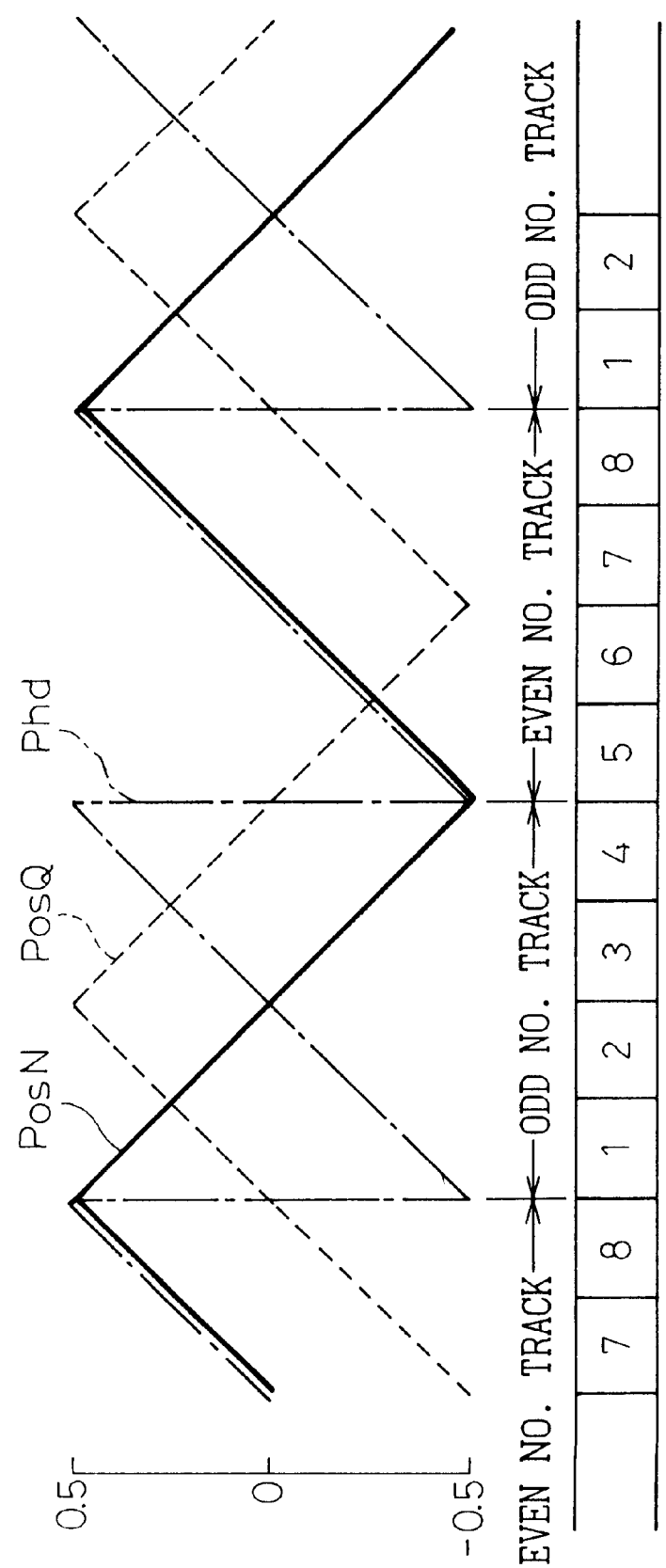

APPARATUS FOR POSITIONING HEAD OF MAGNETIC STORAGE DEVICE

BACKGROUND OF THE INVENTION

1. Field of the Invention

The present invention relates to an apparatus for positioning a head of a magnetic storage device, particularly to an apparatus which is able to enhance the precision of the positioning of a head of a magnetic storage device having a magnetoresistance (MR) head.

2. Description of the Related Arts

Magnetic storage devices are widely used as an external storage device of a computer, and, as the capacity of the magnetic storage device increases and the size of the device is reduced, the density of the recording of the magnetic storage device is being progressively enhanced.

In general, in a medium for storage used in a magnetic storage device, the medium is divided circumferentially into a plurality of sectors and radially into a plurality of tracks, and, by specifying a track and positioning the head at a specific area of the medium for storage, it is possible to write data into or read data from the specific area.

Therefore, to promote the enhancement of the density of the recording, it is very important to position the head so as to achieve the correct positioning of the head at the predetermined position on the medium for storage.

In FIG. 1 which shows a functional diagram of the operation of the two phase servo as one of the methods for positioning the head, the medium 100 for storage is rotationally driven by the spindle motor 101, and the writing and reading of the data are carried out by the head 102. The voice coil motor (VCM) 104 is provided for moving the head 102 in the radial direction on the medium 100 for storage.

In FIG. 2, which illustrates the burst pattern recorded in the burst pattern storage region of the medium 100 for storage and used for positioning the head on a predetermined track, the manner of storing four kinds of the burst signals: PosA, PosB, PosC, and PosD along the circumferential direction and along the radial direction is shown.

In FIGS. 3A–3C, which illustrate the waveforms of the outputs of the head which reads the four kinds of the burst patterns at the three positions (a), (b), and (c) in FIG. 2, a signal with the full amplitude is output when the entirety of the head 102 has passed through the test pattern storage region, that is, for example, when the signal PosA is read at the position (a). When a half of the head 102 has passed through the test pattern storage region, that is, for example, when the signal PosA is read at the position (b), a signal with half the amplitude is output. When the head 102 has passed through the region where no burst pattern is stored, that is, for example, when the signal PosA is read at the position (c), no signal is output.

By inputting the signals PosA, PosB, PosC, and PosD through the read and write portion 115 to the demodulation portion 105 and calculating (PosA-PosB) and (PosC-PosD), a demodulation to the two signals PosQ and PosN of the triangular waveform having 90° phase difference with one cycle period constituted by two tracks is carried out.

The signals PosQ and PosN are transmitted to the sensitivity determination portion 106, the position detection portion 107, the speed detection portion 108, and the head position signal generation portion 109.

The sensitivity determination portion 106 determines the gain G which defines the relationship between the amplitude and the track width of the triangular waveform signals PosQ and PosN.

For example, it is possible to determine the gain G based on the following-equation:

$$G=0.25/|PosQ|$$

by positioning the head at the point where the absolute values of PosQ and PosN are equal and using the absolute value of PosQ for the point where the absolute values of PosQ and PosN are equal within the maximum tolerance.

The position detection portion 107 detects the actual absolute position of the head 102 based on the signals PosQ and PosN, and the track number stored in the burst pattern storage region. The speed detection portion 108 detects the speed of the head 102 based on the time differentiation of the absolute position of the head obtained by synthesizing the signal PosQ or PosN and the track number.

The head position signal generation portion 109 divides each of the signals PosQ and PosN into eight sections along the radial direction, extracts the elements in accordance with a predetermined decoding table, and synthesizes the extracted elements so that the head position signal Phd of the saw-tooth waveform is generated.

In FIG. 4, which illustrates the waveforms of the triangular waveform signals PosQ and PosN, and the head position signal Phd, the abscissa represents the track width read by the servo track writer (hereinafter referred to as STW), and the ordinate represents the track width determined based on the output of the reading head of the magnetic storage device.

The actual absolute position of the head 102 detected in the position detection portion 107 is transmitted to the target speed generation portion 110 where the target speed is generated in accordance with the difference from the target track to be accessed. That is, when the difference is relatively large, the target speed is set to be relatively large, while when the difference is relatively small, the target speed is set to be relatively small.

The speed control portion 111, carries out a control calculation, for example, a proportional integral control calculation based on the target speed generated in the target speed generation portion 110 and the actual speed of the head 102 detected in the speed detection portion 108, and outputs the voice coil motor (VCM) driving signal.

The position control portion 112 outputs the VCM driving signal to position the head 102 at the center of the target track, based on the head position signal Phd representing the actual head position generated in the position signal generation portion 109.

The switching portion 113, which switches between the outputs of the speed control portion 111 and the position control portion 112, by which the position of the head is controlled by the speed control portion 111 to quickly bring the head 102 close to the target position when the difference between the target position and the actual position of the head detected by the position detection portion 107 is large, and the position of the head is controlled by the position control portion 112 to position the head 102 correctly at the center of the target track when the head reaches to the target track. The VCM driving signal output from the switching portion 113 is amplified in the power amplifier 116 the output of which is supplied as a current to the VCM 104.

To position the head 102 by the above-described two phase servo device, it is necessary to determine the gain G which is a transformation coefficient which relates the output of the head and the width of the track to make the amplitudes of the triangular shape waves PosQ and PosN to be ±0.5 times of the width of the track.

In the detection of the position in the position detection portion 107, since the detection is carried out while the head 102 is moving on the recording medium 100, the error of ±1 track with regard to the target track may occur due to an error in reading the track number.

Therefore, the applicant has made the proposal "a method for demodulating position signals and a method for determining position sensitivity" (see Japanese Unexamined Patent Publication (Kokai) No. 8-195044) for enabling to position correctly to the target track and to determine correctly the gain even if the track number is erroneously read, to solve the above-described two problems.

However, to read data from the recording medium 100 in which the data is recorded with high recording density, it is necessary to use a magnetoresistive (MR) head, as the read head, having the read sensitivity of several times greater than that of an inductive head such as a thin film head, and, in the case where the MR head is used, it is necessary to modify the difference in the read sensitivities between the central side (inner side) and the radial side (outer side) of the MR head.

FIG. 5 shows the waveform of the output of the MR head by which the burst pattern stored in the recording medium is read, and FIG. 6 shows the characteristic of the output of the MR head in which the rightwardly rising portion (output increasing portion) and the leftwardly falling portion (output reducing portion) of the waveform are shown, the actually measured values are indicated by the circle marks (○), and the ideal characteristic is indicated by the straight line.

As is seen in FIG. 6, if the position of the head read by the servo track writer (STW) in negative, i.e. if the burst pattern is read by the inner side of the MR head, the actually measured values are outside the ideal characteristic, and hence the reading gain is higher than the ideal characteristic.

Contrary to this, if the position of the head read by the STW is positive, i.e. if the burst pattern is read by the outer side of the MR head, the actually measured values are inside the ideal characteristic, and hence the reading gain is lower than the ideal characteristic.

FIG. 7 shows the reading characteristic showing the reading characteristic of the MR head (which is actually the differential of FIG. 6), in which the high characteristic in the inside and the low characteristic in the outside in the reading characteristic of the MR head are clearly shown.

In the positioning in the magnetic storage device having the MR head with the above-described non-linearity, the MR head is exclusively for the reading, and it is necessary to consider the following points for providing separately a writing head.

That is, when a magnetic storage device is used in the data reading mode, the writing head is required to be positioned at the center of the track, and hence the MR head which reads the burst pattern is required to be positioned offset from the center of the track.

While, when a magnetic storage device is used in the data writing mode, it is necessary only to position the MR head at the center of the track.

Note, the MR head and the writing head can be changed each other.

In relation to this, to compensate for the error caused by the movement of the head along a circular path on the recording medium, there is an apparatus in which the MR head is positioned at the center of the track when the head is used in the writing mode, while the MR head is positioned offset from the center of the track when the head is used in the reading mode.

Thus, in the use of the MR head, since it is necessary to position the MR head not only at the center of the track but also at the position offset from the center of the track, the non-linearity of the MR head has an adverse effect on the positioning of the head.

That is, the following three points become important to position correctly the head in a magnetic storage device having an MR head.

(1) a modification with regard to the non-linearity of the head.

(2) a modification with regard to the shift in the absolute position of the head.

(3) a determination of the gain to establish the correspondence between the output of the head and the width of the track.

A method for compensating the non-linearity of an MR head is disclosed, for example, in Japanese Unexamined Patent Publication (Kokai) No. 8-124136, in which the variation rate for compensating the non-linearity of the MR head is calculated based on the head position read by the MR head and the head position read by the STW when the magnetic storage device is produced, the calculated variation rate is stored in a storage medium, and the stored variation rate is read when the magnetic storage device is used, so that the non-linearity of the MR head is compensated.

In this method, therefore, it is not possible to deal with the problem of the change with time of the non-linearity of an MR head.

Also, a method for correcting the shift of the absolute position of an MR head is disclosed, for example, in Japanese Unexamined Patent Publication (Kokai) No. 5-174510, in which the method is proposed for ensuring the compatibility of the storage medium by correcting the shift of the absolute position of an MR head, not for enhancing the precision of the positioning of an MR head.

The present invention is proposed in view of the above-described problems, and an object of the present invention resides in providing a head positioning device for a magnetic storage device having an MR head in which the precision of the positioning of the head can be enhanced.

SUMMARY OF THE INVENTION

A device for positioning a head of a magnetic storage device according to a first aspect of the present invention comprises: means for reading the burst pattern by the head, generating two triangular shaped waves having the phase difference of 90°, and synthesizing a head position signal from the generating two triangular shaped waves; head position control signal for generating a head position control signal based on the head position signal synthesized by the head position signal synthesizing means and a target head position; gain difference compensating means for multiplying the head position control signal generated by the head position control means by a coefficient the value of which is determined in correspondence with the positive head position control signal or the negative head position control signal to generate a compensation head position control signal; and head positioning means for positioning the head at a target position on the storage medium based on the compensation head position control signal generated in the gain difference compensating means.

In a device for positioning a head of a magnetic storage device according to the first aspect of the present invention, a magnetic storage device having a head, such as an MR head having the reading characteristic which is different between the reading at the inside and the reading at the outside, is used, the head position control signal is multiplied by a coefficient which is determined in correspondence with the positive head position control signal or the negative head position control signal, and accordingly the non-linearity of the head is compensated.

A device for positioning a head of a magnetic storage device according to a second aspect of the present invention further comprises arc-sine function transformation means between the gain difference compensating means and the head positioning means for arc-sine functionally transforming the compensation head position control signal is further provided.

In a device for positioning a head of a magnetic storage device according to the second aspect of the present invention, the output of the gain difference compensating means is arc-sine functionally transformed, and accordingly the linearity in the reading by the head is improved.

A device for positioning a head of a magnetic storage device according to a third aspect of the present invention further comprises compensation characteristic determination means for changing a target head position in the sine wave manner with an amplitude which does not cause the saturation of the head output, for each predetermined timing, and determining the compensation characteristic of the gain difference compensation means so that the positive/negative peak ratio or the positive/negative area ratio of the head output becomes equal within the scope of the maximum allowance.

In a device for positioning a head of a magnetic storage device according to the third aspect of the present invention, the compensation characteristic of the gain difference compensation means is determined for each predetermined timing while the magnetic storage device is used.

A device for positioning a head of a magnetic storage device according to a fourth aspect of the present invention uses a technique to determine the gain difference compensation characteristic of the gain difference compensation means based on the reading characteristic of the head which is measured by using a servo track writer (STW).

In a device for positioning a head of a magnetic storage device according to the fourth aspect of the present invention, the gain difference compensation characteristic of the gain difference compensation means is determined in the process of producing the magnetic storage device.

BRIEF DESCRIPTION OF THE DRAWINGS

FIG. 4 shows the waveforms of the triangular wave and the head position signal;

DESCRIPTION OF THE PREFERRED EMBODIMENTS

Figure 8:
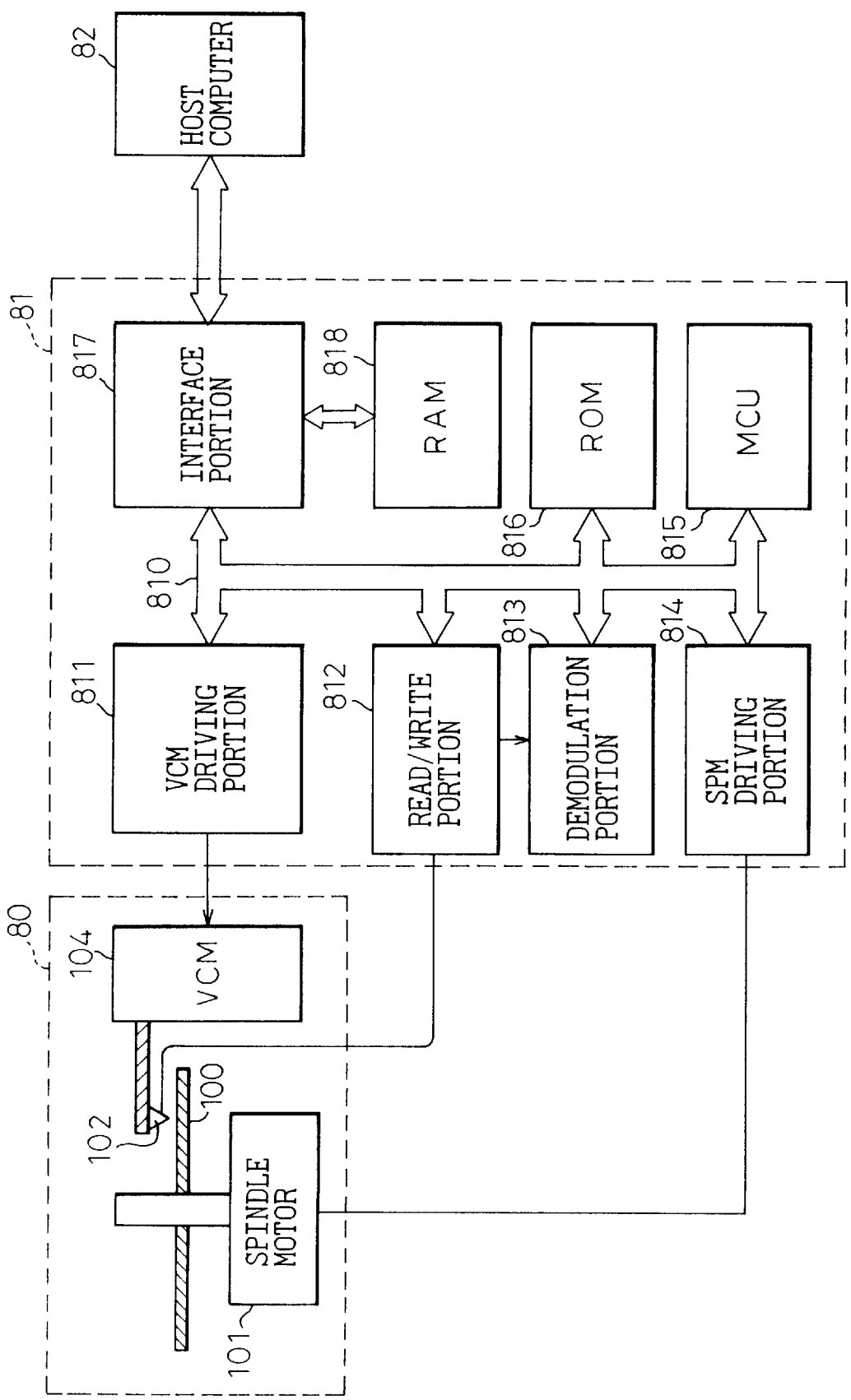
FIG. 8 shows the structure of the magnetic recording device.

FIG. 8 shows the structure of a magnetic storage device including a head positioning device for the magnetic storage device according to the present invention, and the structure is constituted by the hard disk portion 80, the control portion 81, and the host computer 82.

Figure 1:
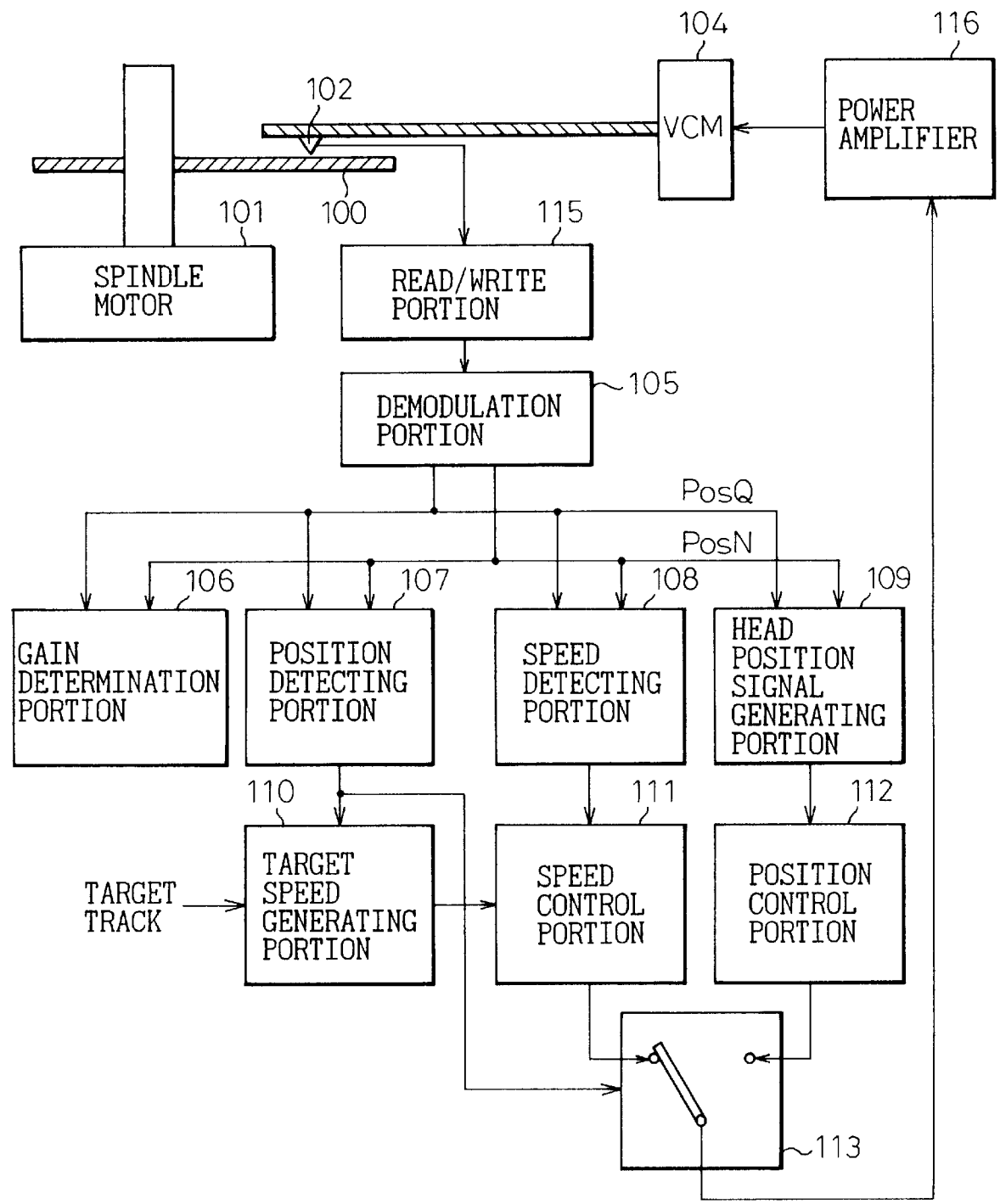
FIG. 1 shows a functional diagram of a two phase servo system.
Figure 2:
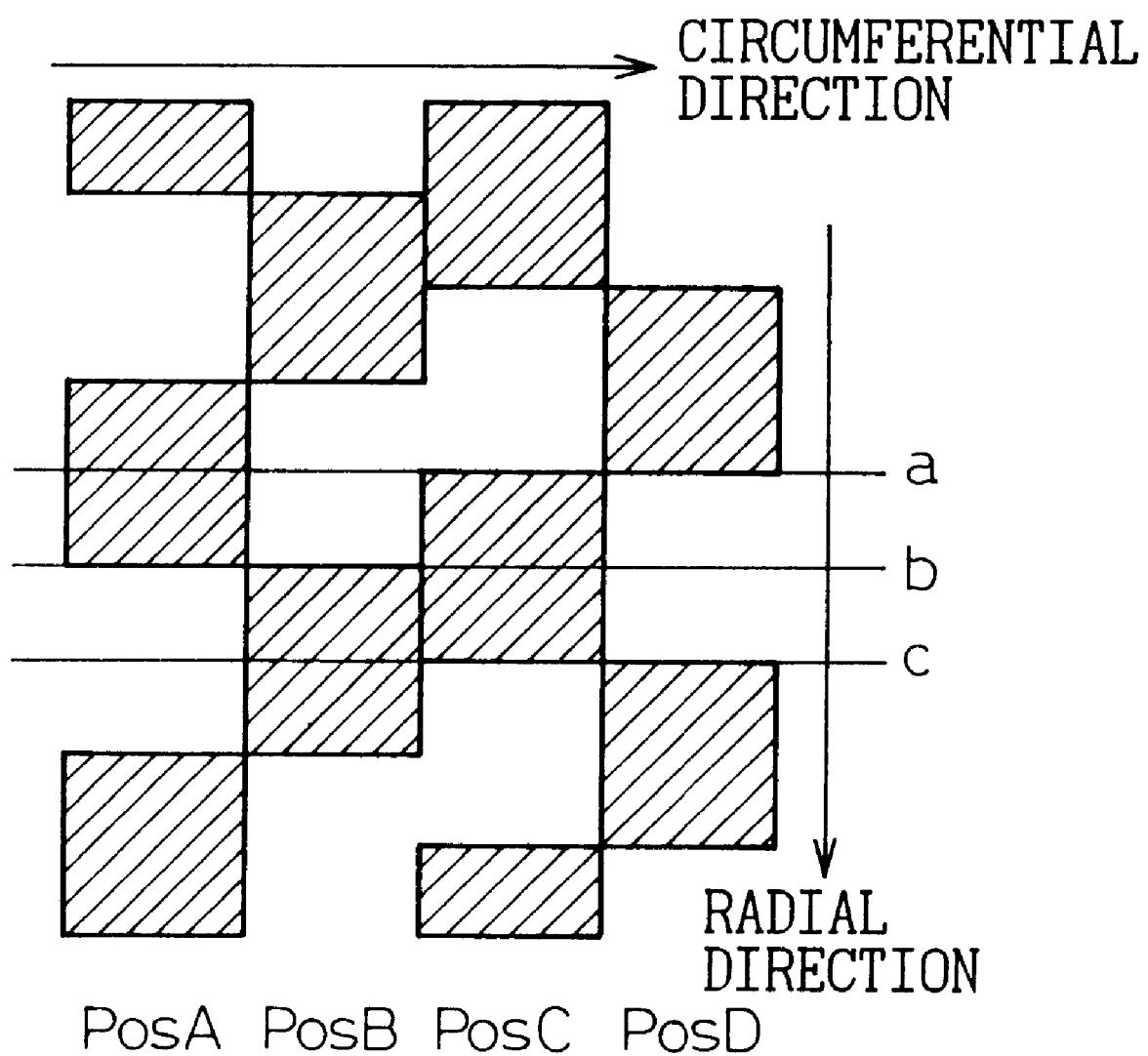
FIG. 2 illustrates a burst pattern.
Figure 3A:
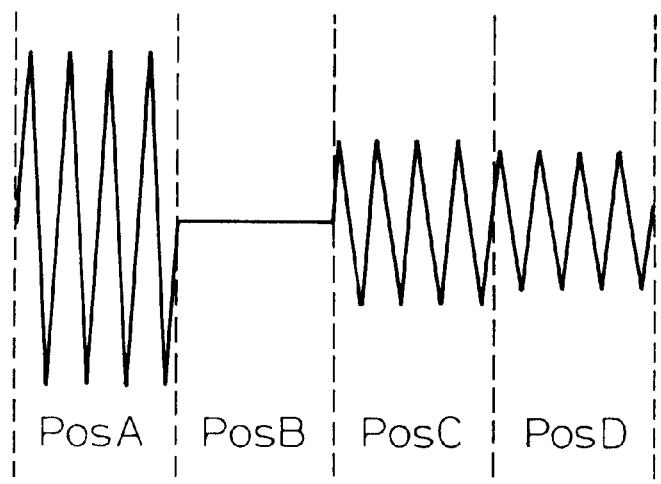
FIG. 3A–3C show the waveforms of the head when the burst pattern is read.
Figure 3B:
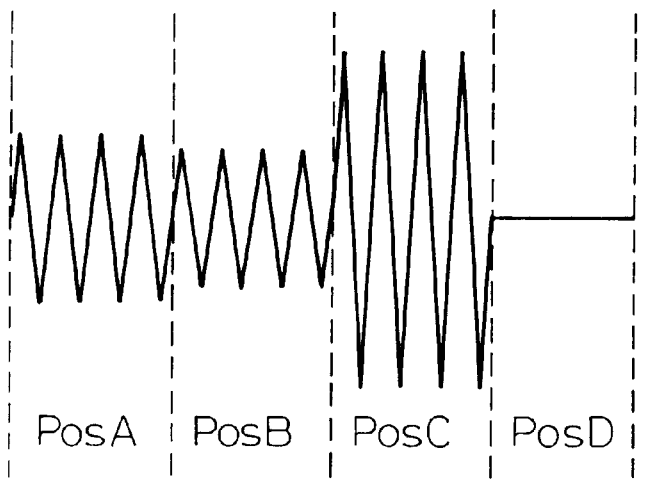
Figure 3C:
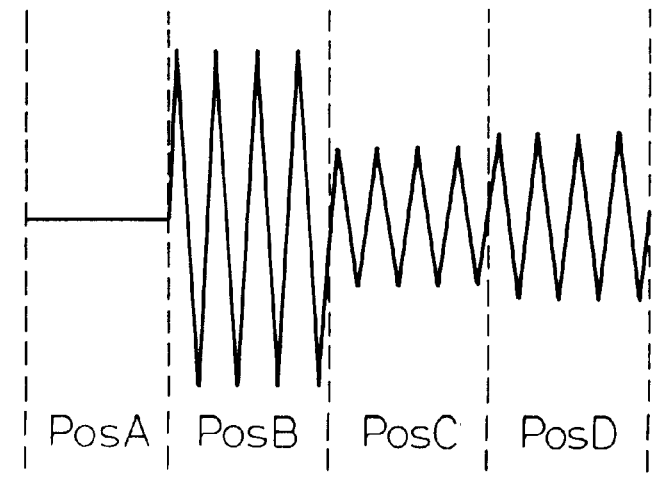
Figure 5:
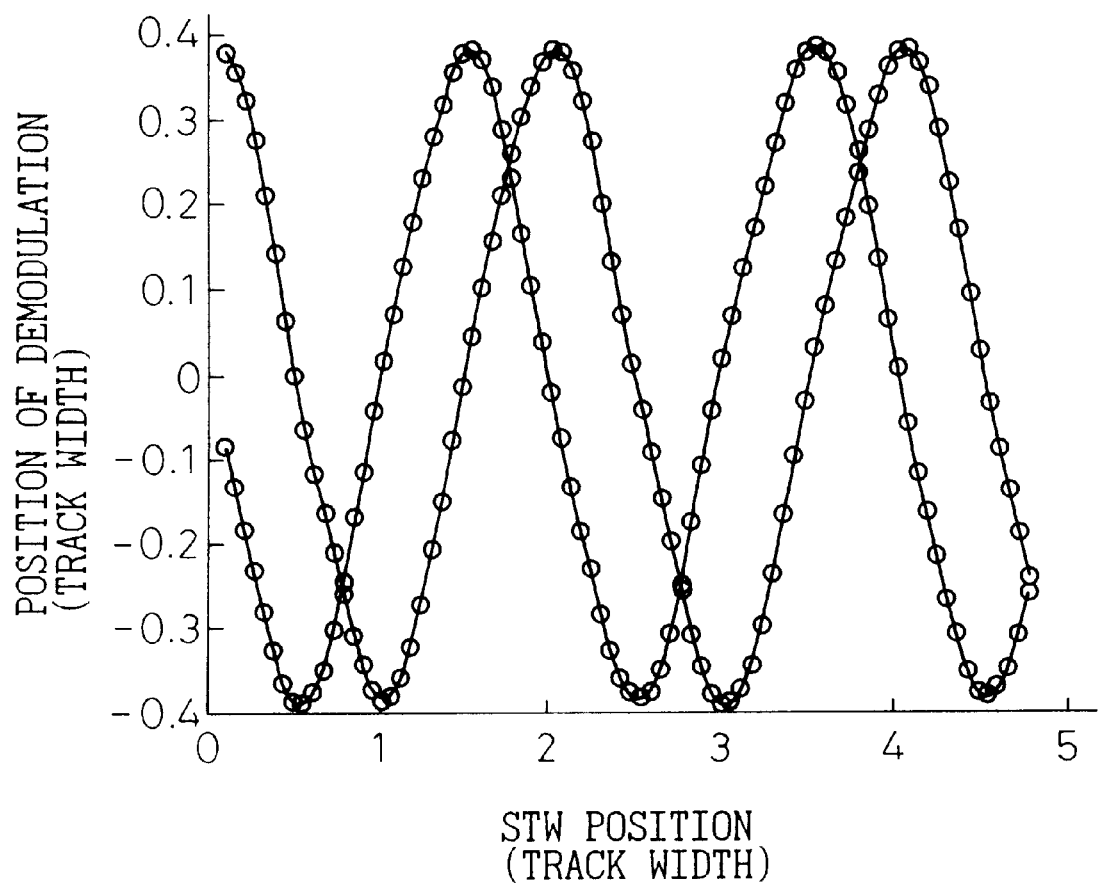
FIG. 5 shows the waveforms of the MR head.

The hard disk portion 80 is constituted, similarly to FIG. 1, by the spindle motor 101 for rotationally driving the recording medium 100, the head 102 for writing data into and reading data from the recording medium 100, and the VCM 104 for moving the head 102 in the radial direction of the recording medium 100.

The control portion 81, which is a microcomputer system, is constituted by the bus 810 as the central constituent, the VCM driving portion 811, the read/write portion 812, the demodulation portion 813, the spindle motor (SPM) driving portion 814, the microcontroller unit (MCU) 815, the read only storage (ROM) 816, the interface portion 817, and the random access storage (RAM) 818 as a cache storage. The control portion 81 is connected through the interface portion 817 to the host computer 82, and the VCM control portion 811 includes the D/A converter and the power amplifier 116.

Figure 9:
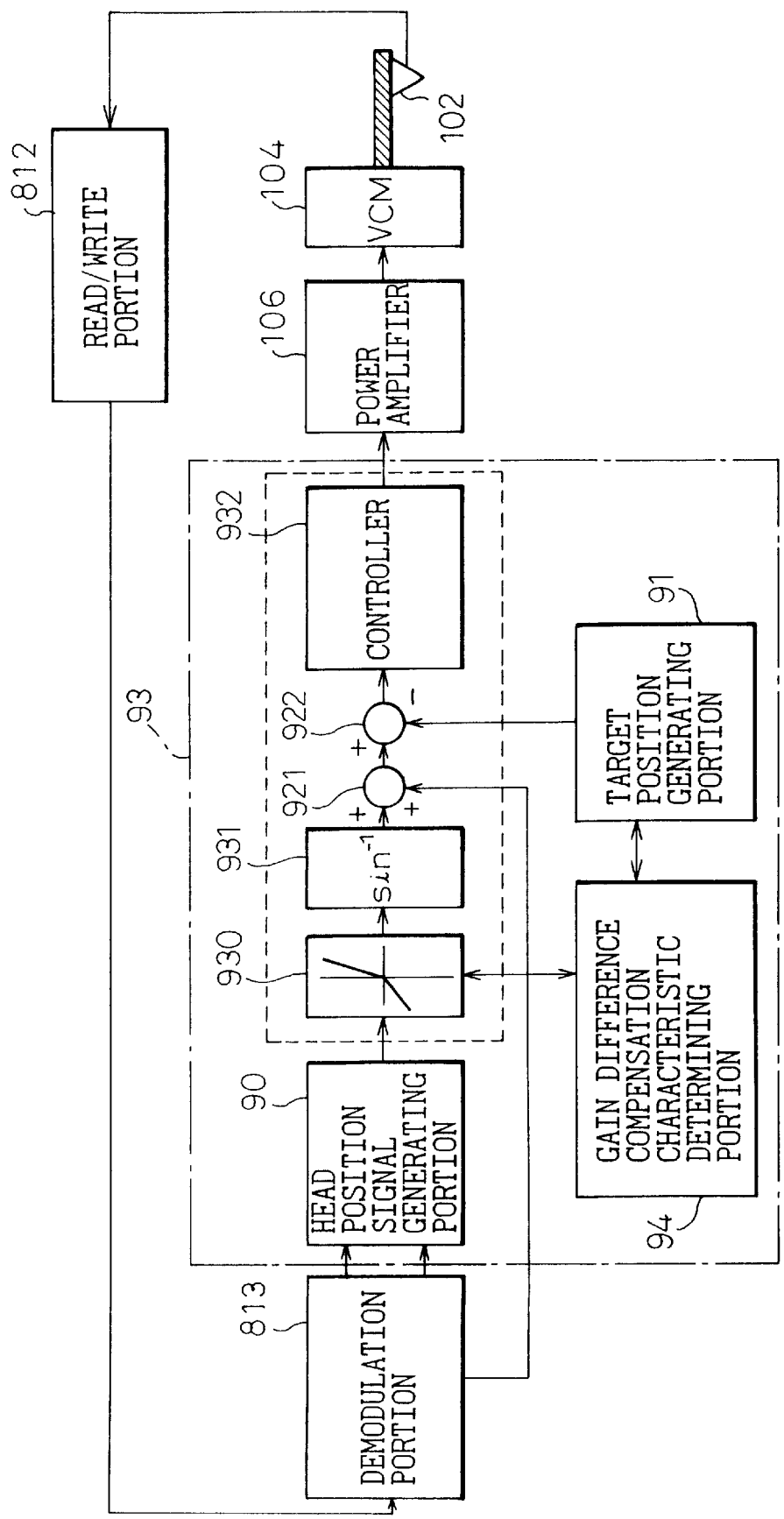
FIG. 9 shows a functional diagram of the head positioning device.

FIG. 9, which is a functional diagram of the head positioning device for a magnetic storage device according to the present invention, shows the state where the head has approached the target track and the speed control has been switched to the position control. That is, the two phase servo signal read by the head 102 is led through the read/write portion 812 to the demodulation portion 813, and the two triangular shaped waves PosN and PosQ and the track number Track are generated in the demodulation portion 813.

The position signal Phd of the head 102 is generated in the head position signal generation portion 90 based on the two triangular shaped waves PosN and PosQ.

The position control portion 93 of the head positioning device for the magnetic storage device according to the present invention includes the gain difference compensation portion 930 and the linearity compensation portion 931 in the preceding stage of a controller 932 which is used in the prior art position control portion 112 (shown in FIG. 1).

That is, the head position signal Phd is compensated concerning the gain difference by the gain difference compensation portion 930, and the compensated output is compensated concerning the linearity by the linearity compensation portion 931, and, to the linearity compensated output, the track number Track is added in the first comparison portion 921 so that the transformation to the absolute position of the head is carried out. In the second comparison portion 922, the deviation ΔP from the target position Ptg generated in the target position generation portion 91 is calculated, and the calculated deviation is led to the controller 932 used for calculating VCM current to position the head at the target position.

The head positioning device for the magnetic storage device according to the present invention further includes the gain difference compensation characteristic determination portion 94 for changing the gain difference compensation characteristic of the gain difference compensation portion 930 at a predetermining timing while the magnetic storage device is used.

The portion enclosed by the one-point chain line in the functional diagram of FIG. 9 is realized by a stored program and the portion other than the enclosed portion is realized by a hard-wired circuit, and the functions of these portions will be described in detail below, but this should not be interpreted as substantially limiting the scope of the present invention.

Figure 10:
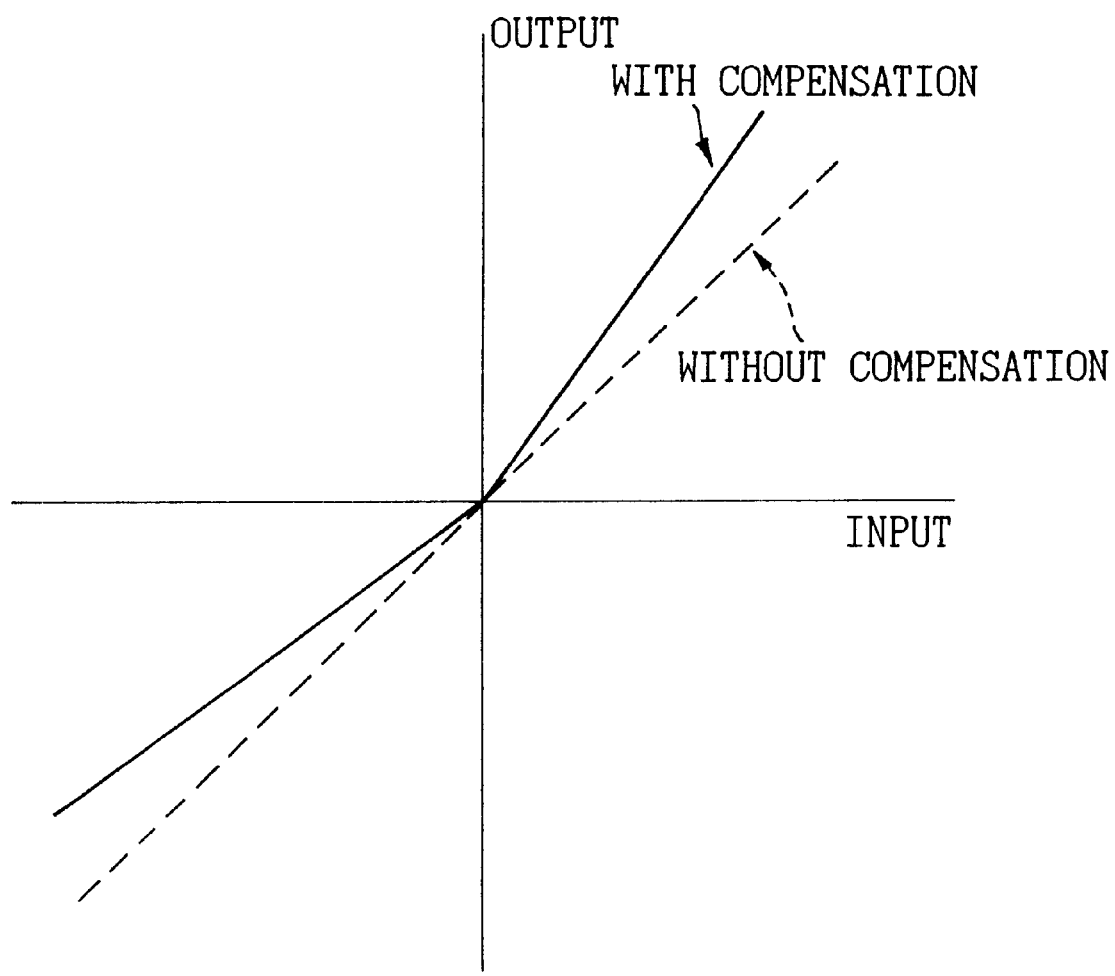
FIG. 10 shows the characteristic of the gain difference compensation.

The gain difference compensation portion 930 is provided for compensating the difference in the data reading characteristic between the reading by the MR head at the inner side and the reading by the MR head at the outer side, and the characteristic of the compensation of the gain difference is shown in FIG. 10.

In FIG. 10, the abscissa represents the input to the gain difference compensation portion 930, while the ordinate represents the output from it. The broken line represents the characteristic in the case where no compensation is carried out. In the case where the input is negative, i.e. where the head is moved to the inner side of the recording medium, the reading gain of the MR head at the inner side is high as described above, and accordingly the output of the gain difference compensation portion 931 is reduced so as to reduce the output of the MR head. In the case where the input is positive, i.e. where the head is moved to the outer side of the recording medium, the reading gain of the MR head at the outer side is low as described above, and accordingly the output of the gain difference compensation portion 930 is increased so as to increase the output of the MR head.

Figure 6:
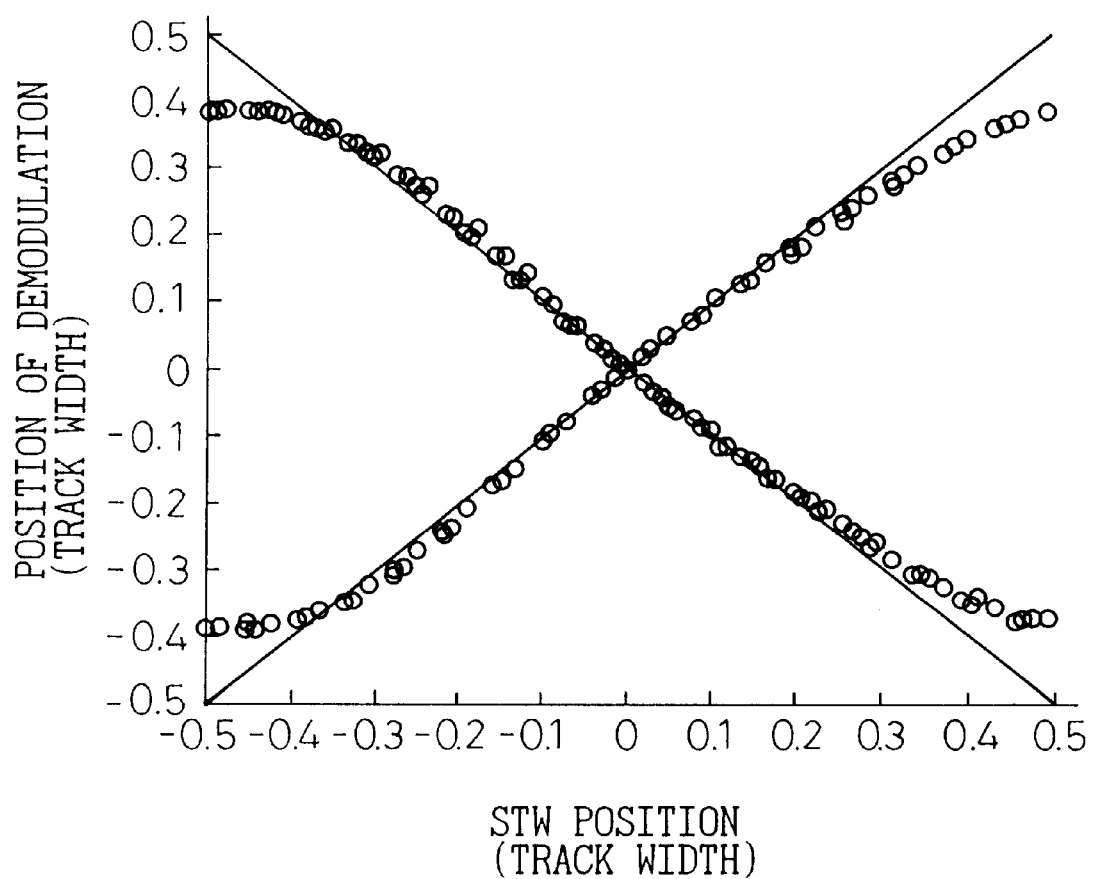
FIG. 6 shows the characteristic of the output of the MR head.
Figure 7:
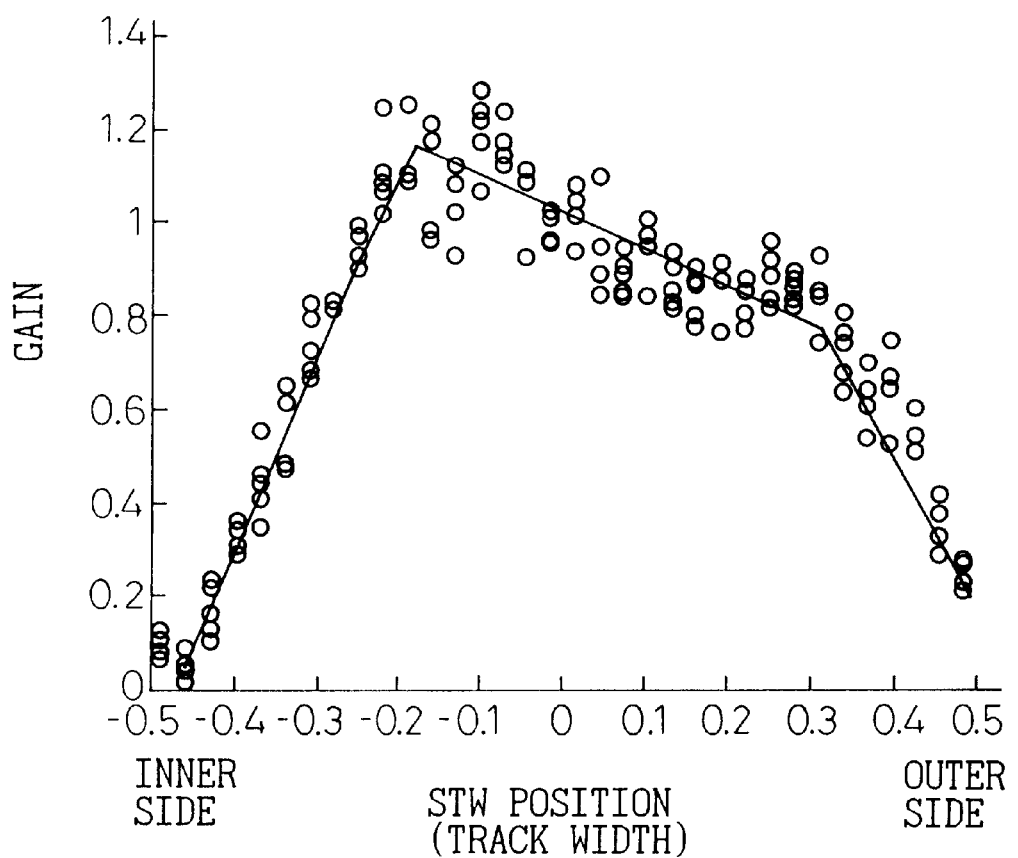
FIG. 7 shows the characteristic of the reading by the MR head.
Figure 11:
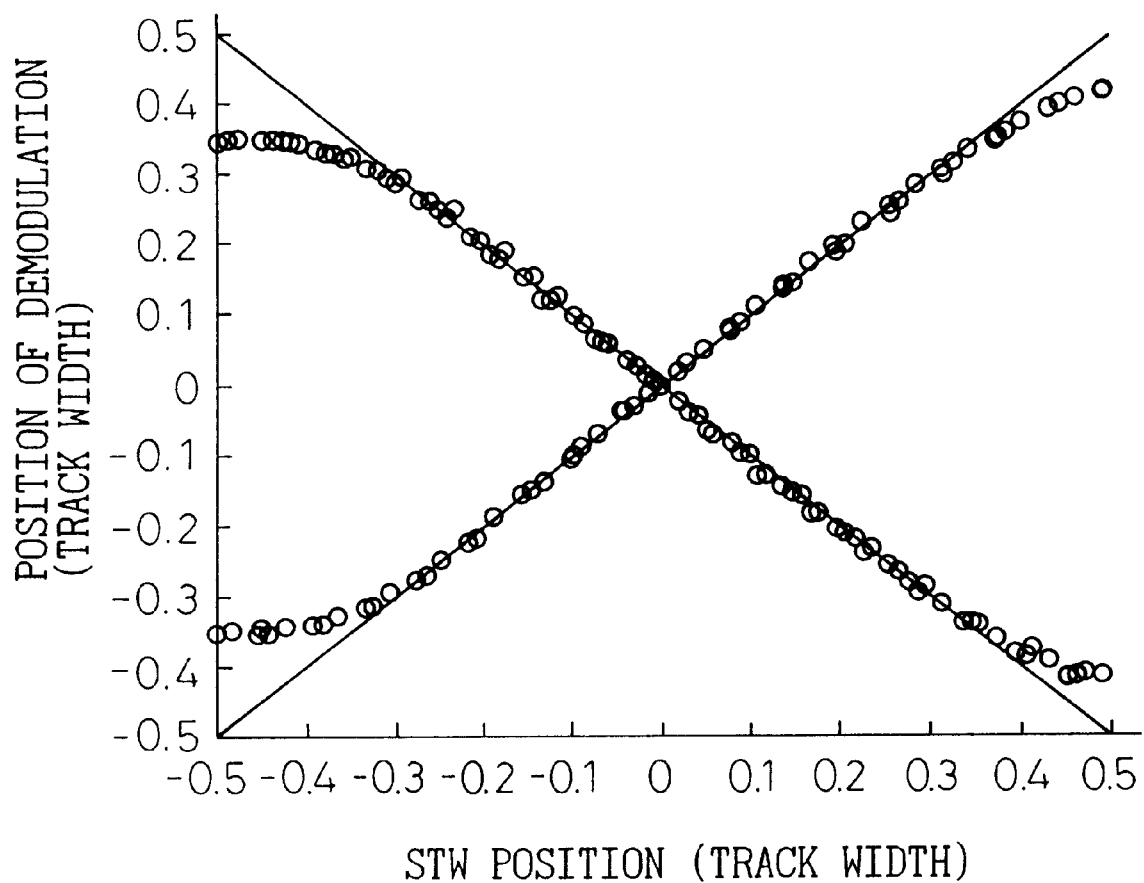
FIG. 11 shows the characteristic of the output of the MR head after the gain difference compensation.

FIG. 11 shows the characteristic of the output of the MR head in the case where the compensation characteristic of the gain difference compensation portion 930 is set to be reduced by 10% from the case of non-compensation when the input is negative while is set to be increased by 10% when the input is positive and the compensation of the gain difference is carried out accordingly. As is seen in the illustration of FIG. 11, by conducting the gain difference compensation, it is possible to improve the linearity within the range of ±0.3 times of the track width compared with the characteristic of the MR head output shown in FIG. 6.

However, the saturation of the output of the MR head cannot be compensated for at the outer side of the ±0.3 track. The linearity compensation portion 931 is provided for improving this saturation characteristic, and the input signal x and the output signal y have the relationship: $y = \sin^{-1} x$.

Figure 12:
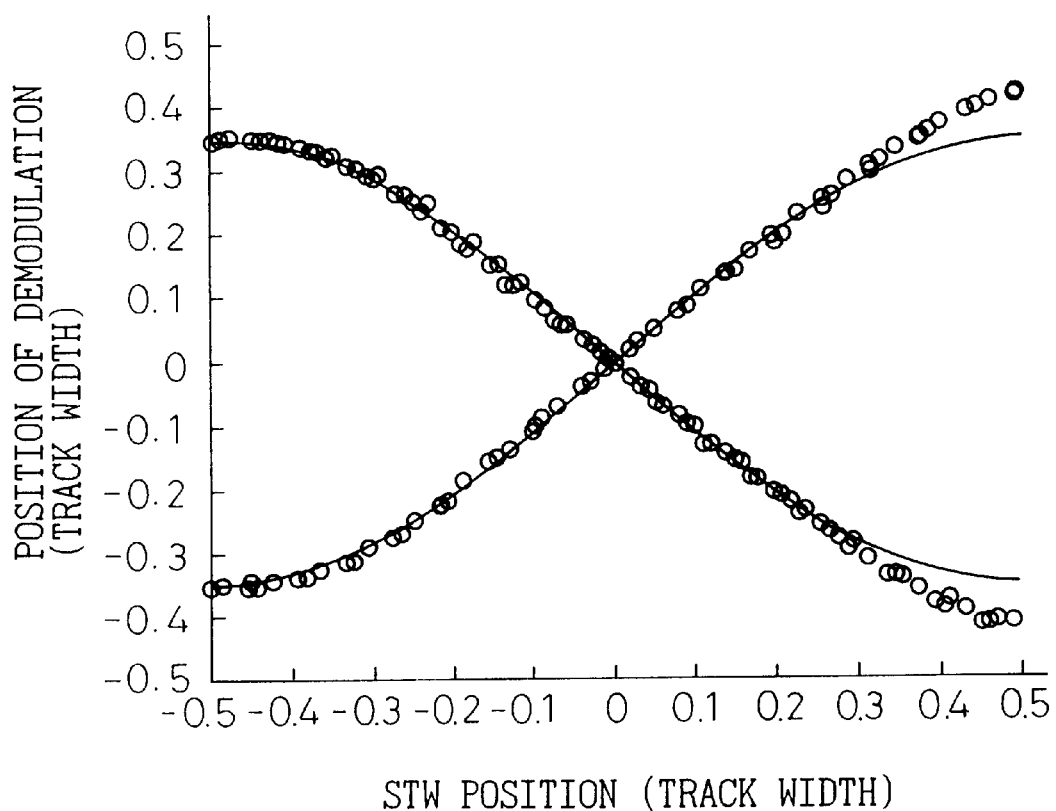
FIG. 12 shows the plottings to the sine wave.

That is, FIG. 12, which indicates the plotting of the outputs of the MR head shown in FIG. 11 to the sine wave, shows that PosN and PosQ detected by the MR head while the MR head is moved in accordance with the signal compensated by the gain difference compensation portion 930 become approximately sine waves.

Thus, it is possible to further improve the linearity by further compensating for the input of the linearity compensation portion 931 which is the output of the gain difference compensation portion 930 by the arc-sine wave function.

Figure 13:
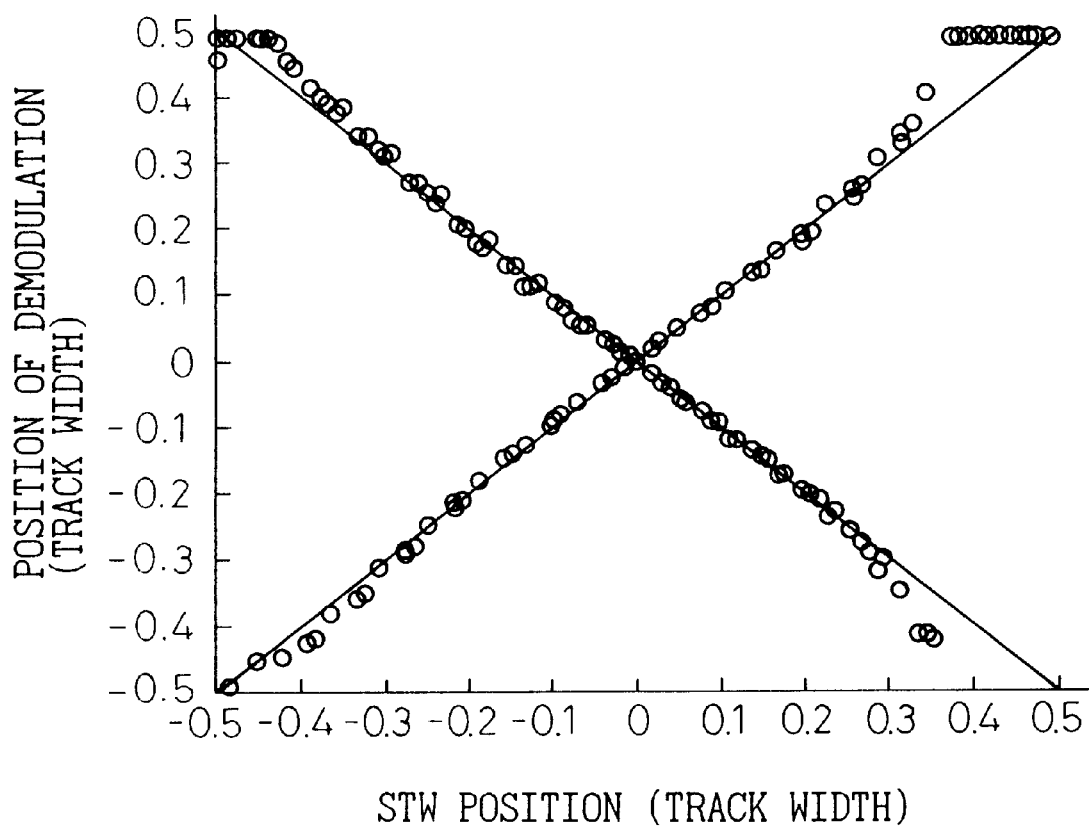
FIG. 13 shows the characteristic of the output of the MR head after the linearity compensation.

FIG. 13, which represents the characteristic of the output of the MR head in the case where the linearity compensation portion 931 is further arranged to follow the gain difference compensation portion 930, shows a further improvement of the linearity compared with the case shown in FIG. 11.

In the above description it is assumed that the characteristic of the output of the MR head itself is correctly acknowledged, and the characteristic of the output of the MR head itself can be measured when the burst signal and the track number are written using the STW when the magnetic recording device is produced. Therefore, it is possible to determine the compensation characteristic of the gain difference compensation portion 930 and the linearity compensation portion 931 by using the characteristic of the output of the MR head itself measured while the device is produced. The gain difference compensation 930 is indispensable for compensating the gain difference of the MR head, but the linearity compensation portion 931 should be provided only when the further improvement of the linearity is necessary.

Since the characteristic of the output of the MR head itself is not unchangeable but is changeable with time, if the compensation characteristic of the gain difference compensation portion 930 is determined while the magnetic recording device is used, it is possible to compensation the change with time of the characteristic of the output of the MR head.

Figure 14:
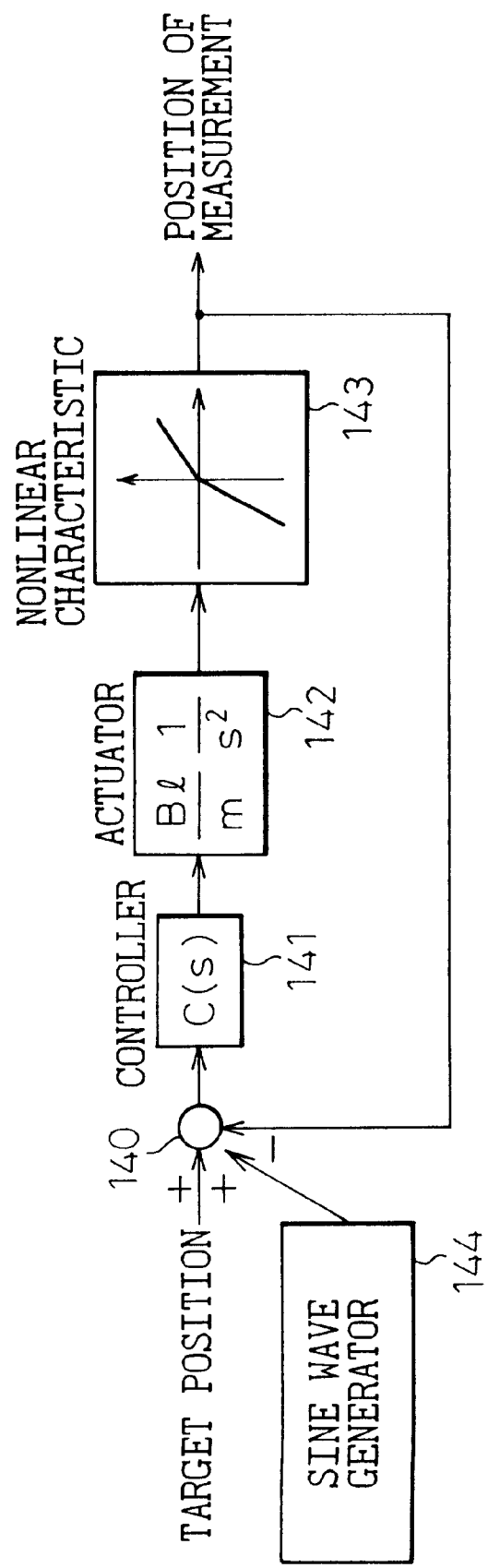
FIG. 14 shows a block diagram of the first sitluation test.

FIG. 14 is a block diagram of the first simulation test conducted for finding a method to determine the compensation characteristic while the magnetic recording device is used, and, in this test, the deviation of the position of the observation of the head from the target position is calculated in the position comparison portion 140. A control calculation is applied to the deviation by the controller 141, and the actuator (VCM) 142 is driven by the output of the controller. The non-linearity characteristic 143 represents the reading gain difference of the MR head, and the output is fed back as the position of the observation of the head. The target position of the head is changed in a sine wave manner by the sine wave generator 144.

Figure 15:
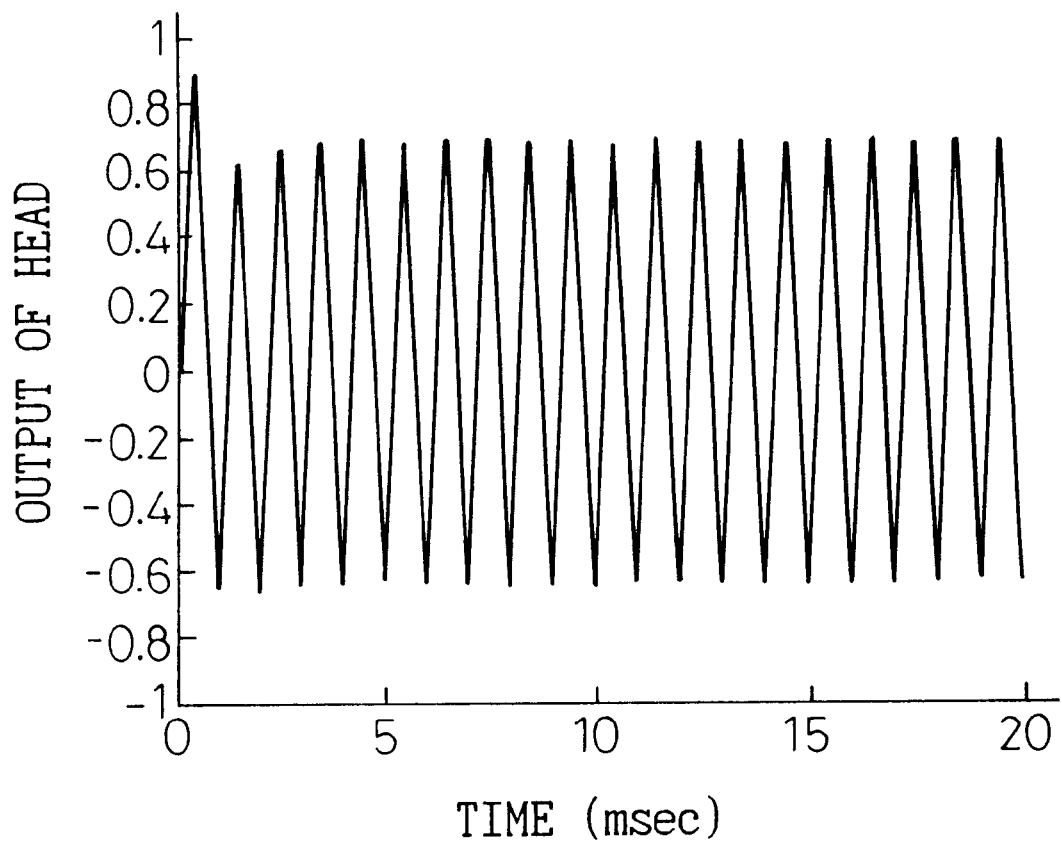
FIG. 15 shows an example of the result of the First simulation test.

FIG. 15 shows an example of the first simulation test, and, in FIG. 15, the abscissa represents the time while the ordinate represents the position of the observation of the head. In this example, the observed head position becomes a stationary sine waveform after the transient time of approximately 5 milliseconds has elapsed.

Figure 16:
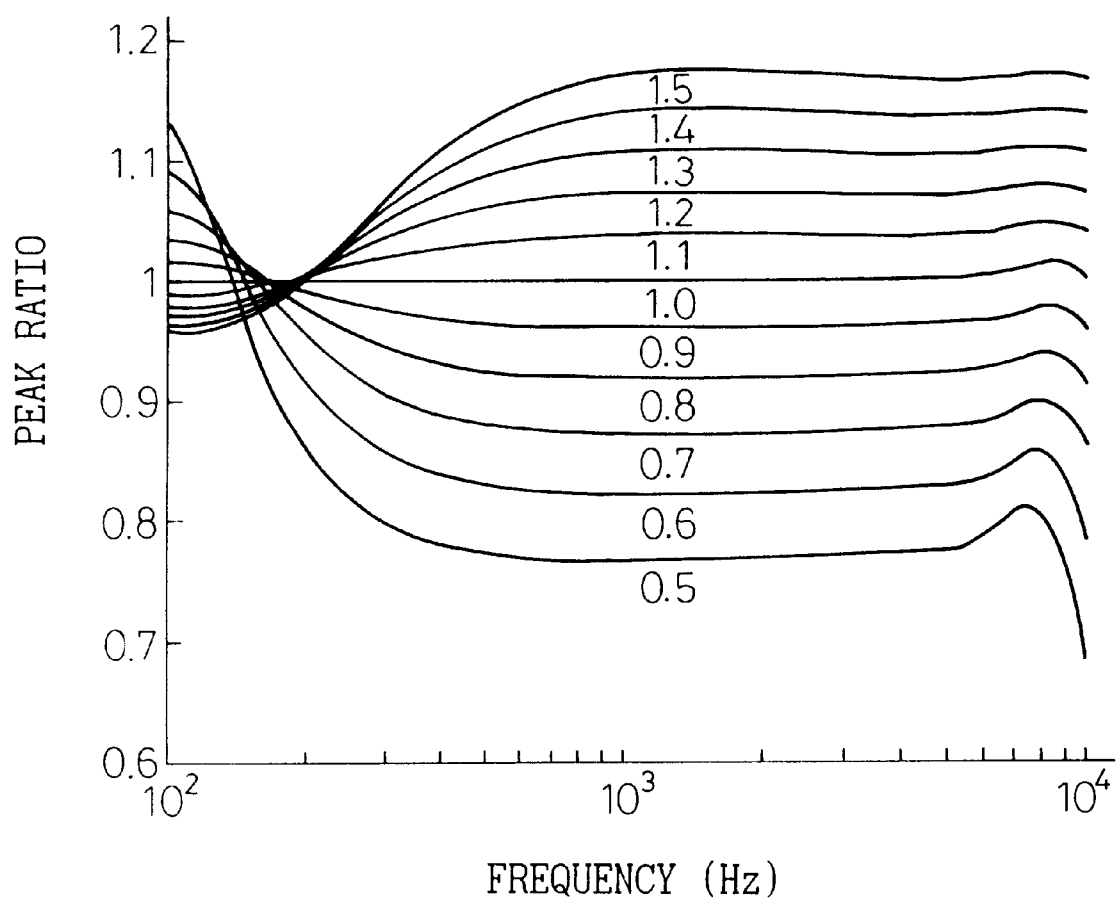
FIG. 16 illustrates the result of the first simulation test.

FIG. 16 indicates the result of the first simulation test representing the relationship between the frequency of the sine wave and the peak ratio Pr which is equal to the absolute value of the ratio: the positive peak value/the negative peak value (|positive peak value/negative peak value|) with the parameter of the gain ratio Gr of the non-linearity characteristic, the gain ratio being equal to the ratio: the positive gain Gp/the negative gain Gn. FIG. 16 represents that the gain ratio and the peak ratio are changed keeping the one-to-one relationship between the gain ratio and the peak ratio if the frequency is appropriately selected, that is the peak ratio can be changed unconditionally by adjusting the gain ratio.

Figure 17:
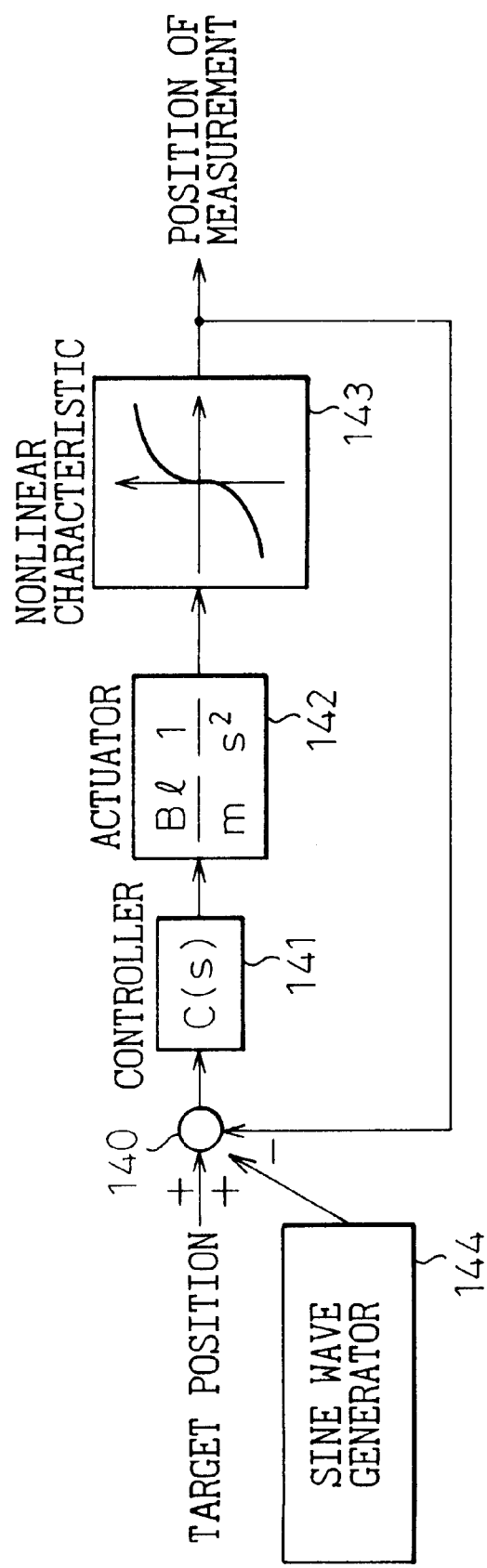
FIG. 17 shows a block diagram of the second simulation test.

FIG. 17 is a block diagram of the second simulation test carried out for finding a way to determine the compensation characteristic while the magnetic recording device is used in which the reading characteristic of the MR head 102, the non-linearity characteristic 143 of the MR head being actually measured by using the STW.

Figure 18:
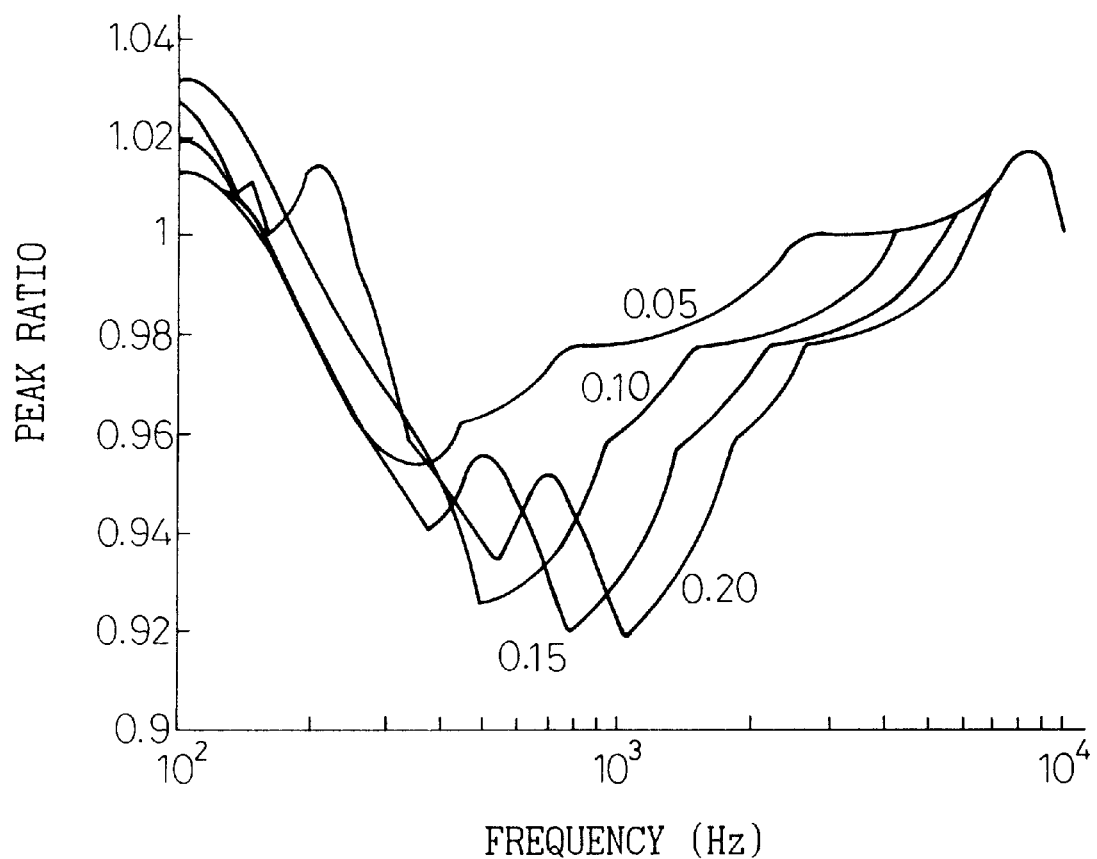
FIG. 18 illustrates the result of the second simulation test.

FIG. 18 indicates the result of the second simulation test with the parameter of the amplitude of the sine wave, and, in FIG. 18, for example, 0.20 represents that the amplitude of the sine wave is 0.20 track as the p—p value.

From FIG. 18, it is seen that, if the frequency of changing the target position of the head is selected to be approximately 1.5 kHz, the amplitude and the peak ratio of the sine wave are changed while the one-to-one relationship is maintained, i.e. the peak ratio can be unconditionally changed by changing the amplitude of the sine wave.

From the results of the above-described two simulation tests, it is supposed to be possible to determine the characteristic of the gain difference compensation portion 930 by moving the head in the sine wave manner with appropriate timings and selecting the gain ratio Gr so that the ratio of the positive and negative peak values of the output of the head in the steady state is 1.0.

Figure 19:
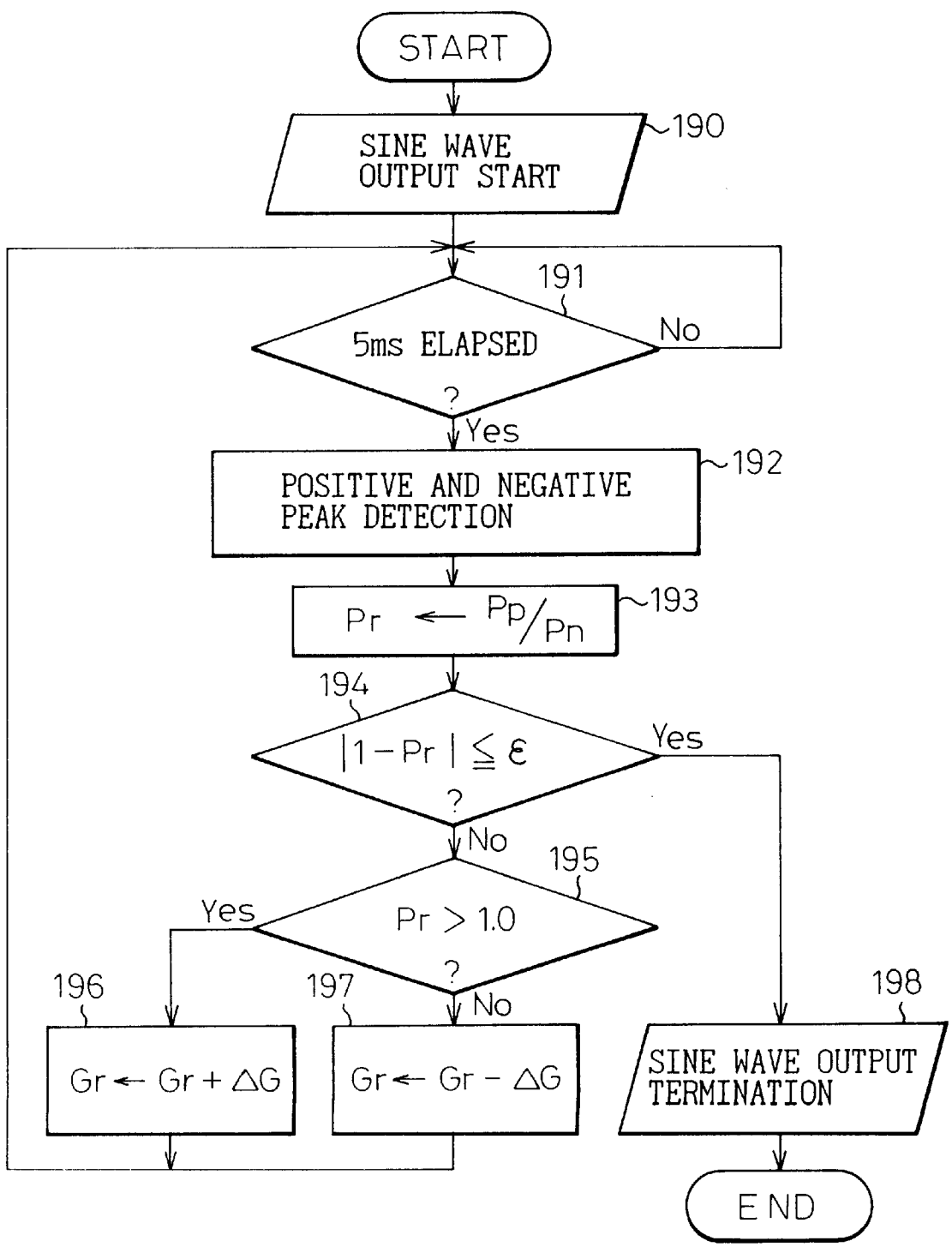
FIG. 19 shows a flow chart of the routine for determining the first gain difference compensation characteristic.

FIG. 19 shows a flow chart of a first routine to determine the characteristic of the compensation of the gain difference, and this routine is carried out at a predetermined timing, such as, for example, when the power source of the magnetic recording device is switched on, when a predetermined length of time has elapsed, when the ambient temperature changes by a temperature greater than a predetermined temperature, or the read errors or the write errors have occurred more frequently than a predetermined frequency. This routine represents the operation of the gain difference compensation determination portion 94 in the functional diagram of FIG. 9.

In step 190, for example, the outputting of the sine wave with the frequency of 1.5 kHz, and an amplitude of 0.2 track p—p, is started. In step 191, a predetermined waiting period, for preventing the transient response, of for example 5 msec elapses. After the expiration of this waiting period, the process proceeds to step 192 where the positive peak Pp and the negative peak Pn are detected. It is possible to carry out this detection by using one peak detected by the peak detection circuit, and it is also possible to enhance the precision of the detection of the peak by averaging a plurality of peaks detected during a predetermined period by the peak detection circuit.

In step 193, the peak ratio Pr is calculated based on the equation: Pr=Pp/Pn.

In step 194, the peak ratio Pr is compared with 1.0 to determine whether or not the peak ratio is within a predetermined maximum allowance, for example 0.5%, and if the peak ratio is outside the predetermined maximum allowance, it is determined in step 195 whether or not the beak ratio Pr is equal to or more than 1.0.

If the peak ratio Pr is equal to or more than 1.0, the gain ratio Gr is incremented by a predetermined amount ΔG, for example 0.01, in step 196, and the process returns to step 191. Contrary to this, if the peak ratio Pr is less than 1.0, the gain ratio Gr is decremented by ΔG in step 197, and the process returns to step 191.

If, in step 194, the peak ratio Pr is compared with 1.0 and is determined to be within the predetermined maximum allowance, the generation of the sine wave is stopped in step 198 and this routine is completed.

In the above-described example, the gain ratio is determined based on the peak ratio, it is also possible to determine the gain ratio based on the ratio between the positive side area surrounded by the amplitude center and the sine wave and the negative side area surrounded by the amplitude center and the sine wave. In accordance with the above-described example, it is possible to determine the gain ratio even if the characteristic of the output of the MR head has not been measured in the process of manufacturing the magnetic storage device.

In the above-described first gain difference compensation characteristic determination routine, it is necessary to repeat performing the calculation until the peak ratio Pr is converged to 1.0, but, if the characteristic of the output of the MR head have been measured in the process of manufacturing the magnetic storage device, it is possible to store the result of such measurement as a map in the ROM 18 to avoid the repetitive calculations.

Figure 20:
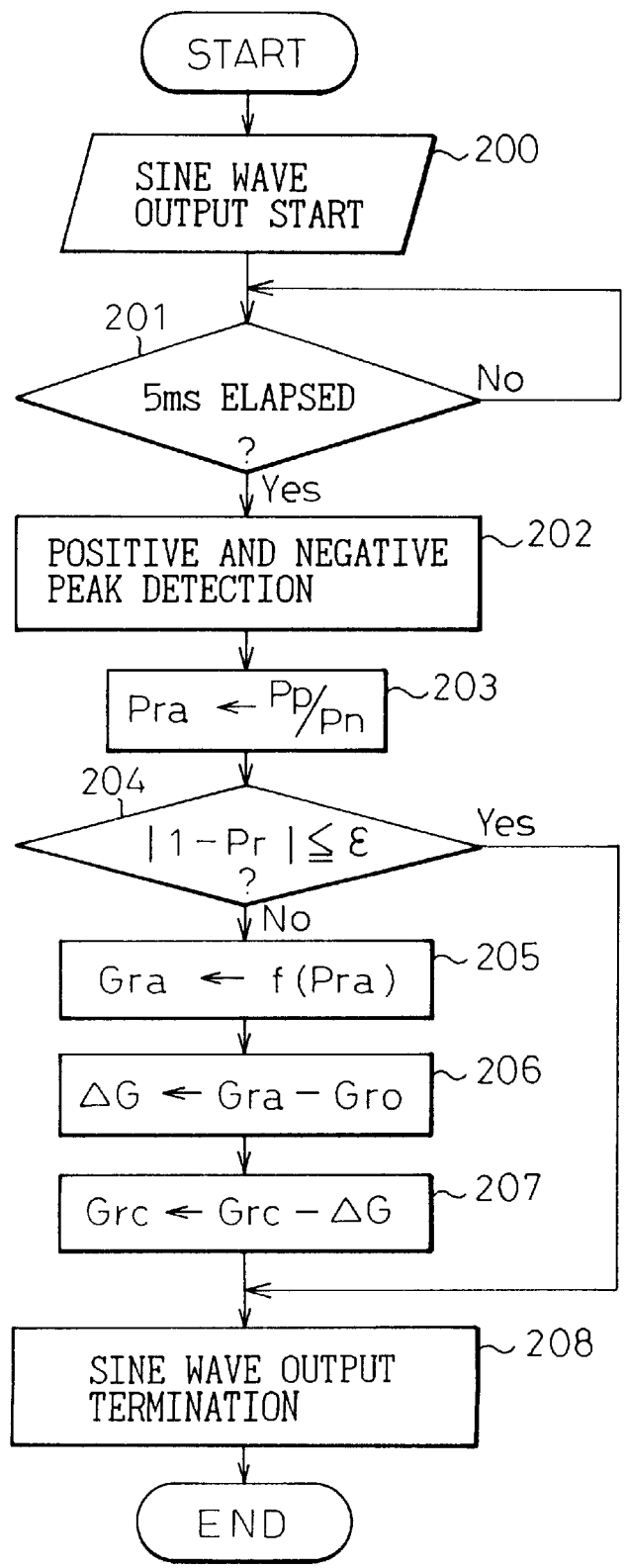
FIG. 20 shows a flow chart of the routine for determining the second gain difference compensation characteristic.

FIG. 20 shows a flow chart of the routine of determining the second gain difference compensation characteristic, and in FIG. 20 the processes up to step 204 are the same as the case of the first gain difference compensation characteristic determination routine.

That is, in step 200, the outputting of the sine wave with the frequency of 1.5 kHz, and the amplitude of 0.20 track p—p is started. In step 201, a predetermined waiting period, for preventing the transient response, of for example 5 msec elapses. After the expiration of this waiting period, the process proceeds to step 202 where the positive peak Pp and the negative peak Pn are detected.

In step 203, the peak ratio Pr is calculated based on the equation: Pr=Pp/Pn.

In step 204, the peak ratio Pr is compared with 1.0 to determine whether or not the peak ratio is within a predetermined maximum allowance, for example 0.5%, and if the peak ratio is outside the predetermined maximum allowance, the process proceeds to step 205 where the present gain ratio Gra is derived from the present peak ratio Pra. This is expressed as Gra=f(Pra).

Figure 21:
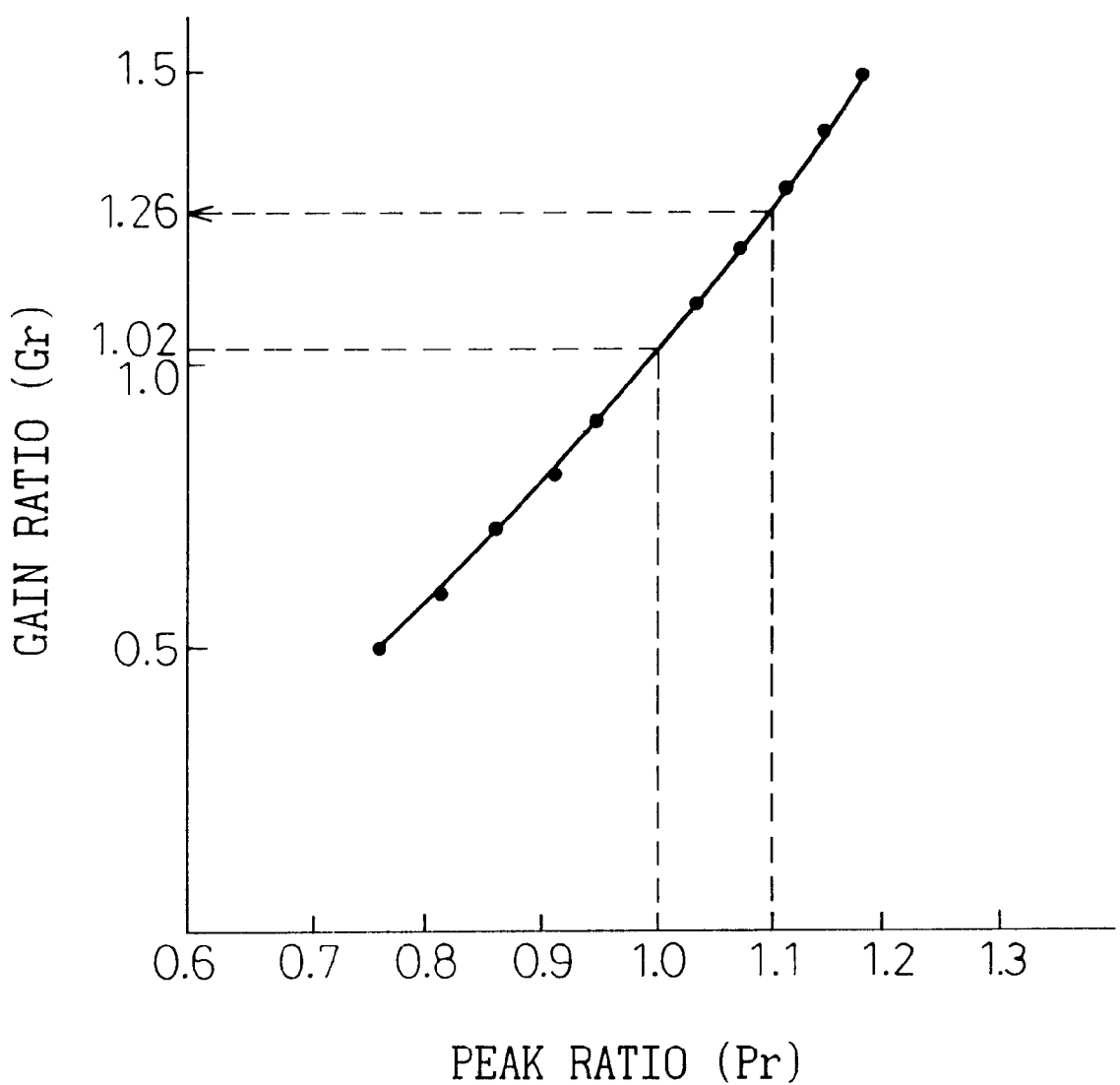
FIG. 21 shows the relationship between the peak ratio and the gain ratio.

FIG. 21 shows an example of the characteristic of the relationship between the peak ratio Pr and the gain ratio Gr which is drawn based on FIG. 16. For example, it is shown that, when the present peak ratio Pra is measured to be 1.0, the present gain ratio Gra is 1.26.

In step 206, the difference ΔG between the present gain ratio Gra and the gain ratio Gro for the case where the peak ratio Pr is assumed to be 1.0 is obtained. This is expressed as ΔG=Gra−Gro.

In FIG. 21, the total gain ratio Gro for the case where the peak ratio Pr is 1.0 is 1.01, and hence the gain difference ΔG is given as 1.26−1.01=0.25. That is, it is regarded that the gain ratio of the MR head due to the change with time is increased by 0.25.

In step 207, the gain ratio Grc set in the gain difference compensation portion 931 is reduced by the gain difference ΔG which is equal to 0.25, and then this routine is terminated. This is expressed as Grc=Grc−ΔG.

In step 208, the outputting of the sine wave is stopped to terminate this routine. In step 204, if the peak ratio Pr is compared with 1.0 and is determined as being within a predetermined scope of the maximum allowance, the process proceeds directly to step 208.

As described above, it is possible to determine the gain ratio for correcting the gain difference of the MR head, but it is not possible to determine the gain itself.

To determine the gain G, it is necessary to produce correctly the head position signal Phd in the decoding portion 90 based on the two triangular shaped waves PosQ and PosN, and, in conducting the decoding, attention should be drawn to the following two points.

That is, the first point is that, to eliminate the effect of the saturation characteristic of the MR head, the head position signal Phd should be produced from the portion as close as possible to the center of the amplitudes of the two triangular shaped waves PosQ and PosN.

The second point is that, even if the read value of the track number is offset by one track, the correct head position signal Phd should be produced.

Therefore, the two tracks are divided into four regions for each track to form eight regions in total, that is, one cycle period of the two triangular shaped waves PosQ and PosN is divided into eight regions, the portions close to the centers of the two triangular shaped waves PosQ and PosN are cut, that is one of the PosQ and PosN having lower absolute value is cut, and the thus cut waveforms are synthesized, so that the head position signal Phd is produced.

List 1 is given as follows.

List 1

| region No. | PosN | PosQ | track No. | head position number |
|---|---|---|---|---|
| 1 | + | + | odd | Gp*PosQ + Track − 0.5 |
| 2 | + | + | odd | -Gn*PosN + Track |
| 3 | − | + | odd | -Gp*PosN + Track |
| 4 | − | + | odd | -Gn*PosQ + Track + 0.5 |
| 5 | − | − | even | -Gp*PosQ + Track − 0.5 |
| 6 | − | − | even | Gn*PosN + Track |
| 7 | + | − | even | Gp*PosN + Track |
| 8 | + | − | even | Gn*PosQ + Track + 0.5 |

List 1 shows a decoding list for producing the head position signal Phd, in which the point where the triangular shaped wave PosQ intersects the center of the amplitude from the negative side to the positive side is adopted as the original point, that is the beginning point of the first region.

The head position signal Phd is generated by shifting the PosQ signal parallelly by −0.5 times of the track width in the first region, while by reversing the sign of the PosN signal in the second region. In the List 1, the "Track" represents the read track number.

To compensate for the characteristic of the output of the MR head, the cut triangular shaped waves PosQ and PosN are multiplied by the positive side gain Gp and the negative side gain Gn. That is, when the element of the triangular shaped wave used for the synthesis of the head position signal Phd is at the left of the nearest zero-crossing point, the burst signal is read at the inner side of the MR head, and accordingly the multiplication by the positive side gain Gp is carried out. Contrary to this, when the element of the triangular shaped wave used for the synthesis of the head position signal Phd is at the right of the nearest zero-crossing point, the burst signal is read at the outer side of the MR head, and accordingly the multiplication by the negative gain Gn is carried out. The methods to determine the positive side gain Gp and the negative side gain Gn will be described later.

The above description is based on the assumption that the read track number is a correct one. However, in the case where the MR head is moving in the direction to increase the track number, there is a possibility to erroneously recognize the preceding track number as an actual track number, while in the case where the MR head is moving in the direction to reduce the track number, there is a possibility to erroneously recognize the following track number as an actual track number.

Nevertheless, it is possible to detect the erroneous recognition of the track number by inspecting the match of the odd/even of the target track number and the signs of the two triangular shaped waves PosQ and PosN. For example, in the case where the target track number is an even number, it is impossible that both PosQ and PosN are positive, while in the case where the target track number is an odd number, it is impossible that both PosQ and PosN are negative.

In view of this, if, in the case where the target track number is an even number, both the PosQ and the PosN are positive in the first and second regions, or, in the case where the target number is an odd number, both the PosQ and the PosN are negative in the fifth and sixth regions, it is assumed that the preceding track number is erroneously read, and 1 is to be added to the read track number "Track" and the resultant track number is to be adopted as the head position signal Phd.

If in the case where the target track number is an even number, the PosN is negative and the PosQ is positive in the third and fourth regions, or, in the case where the target track number is an odd number, the PosN is positive and the PosQ is negative in the seventh and eighth regions, it is assumed that the following track number is erroneously read, and 1 is subtracted from the read track "Track" and the resultant track number is to be adopted as the head position signal Phd.

List 2 is given as follows.

List 2

| region No. | PosN | PosQ | target track No. | head position number |
|---|---|---|---|---|
| 1 | + | + | even | Gp*PosQ + Track − 0.5 |
| 2 | + | + | even | -Gn*PosN + Track + 1.0 |
| 3 | − | + | even | -Gp*PosN + Track − 1.0 |
| 4 | − | + | even | -Gn*PosQ + Track − 0.5 |
| 5 | − | − | odd | -Gp*PosQ + Track + 0.5 |
| 6 | − | − | odd | Gn*PosN + Track + 1.0 |
| 7 | + | − | odd | Gp*PosN + Track − 1.0 |
| 8 | + | − | odd | Gn*PosQ + Track − 0.5 |

List 2 shows a list of the decoding for the case where the track number is erroneously read, in which, in relation to the values of the decoding in List 1, in the first, second, fifth, and sixth regions, 1 is added to the read track number "Track" and the resultant track number is adopted as the track number, while, in the third, fourth, seventh, and eighth region, 1 is subtracted from the read track number "Track" and the resultant track number is adopted as the track number.

In the above described cases, it is assumed that the two triangular waves PosQ and PosN have the amplitude of ±0.5 times of track p—p, and the cycle period of 2 tracks, but is practically necessary that the gain G is determined so as to establish the above-mentioned relationship between the output of the MR head and the width of the track.

Figure 22:
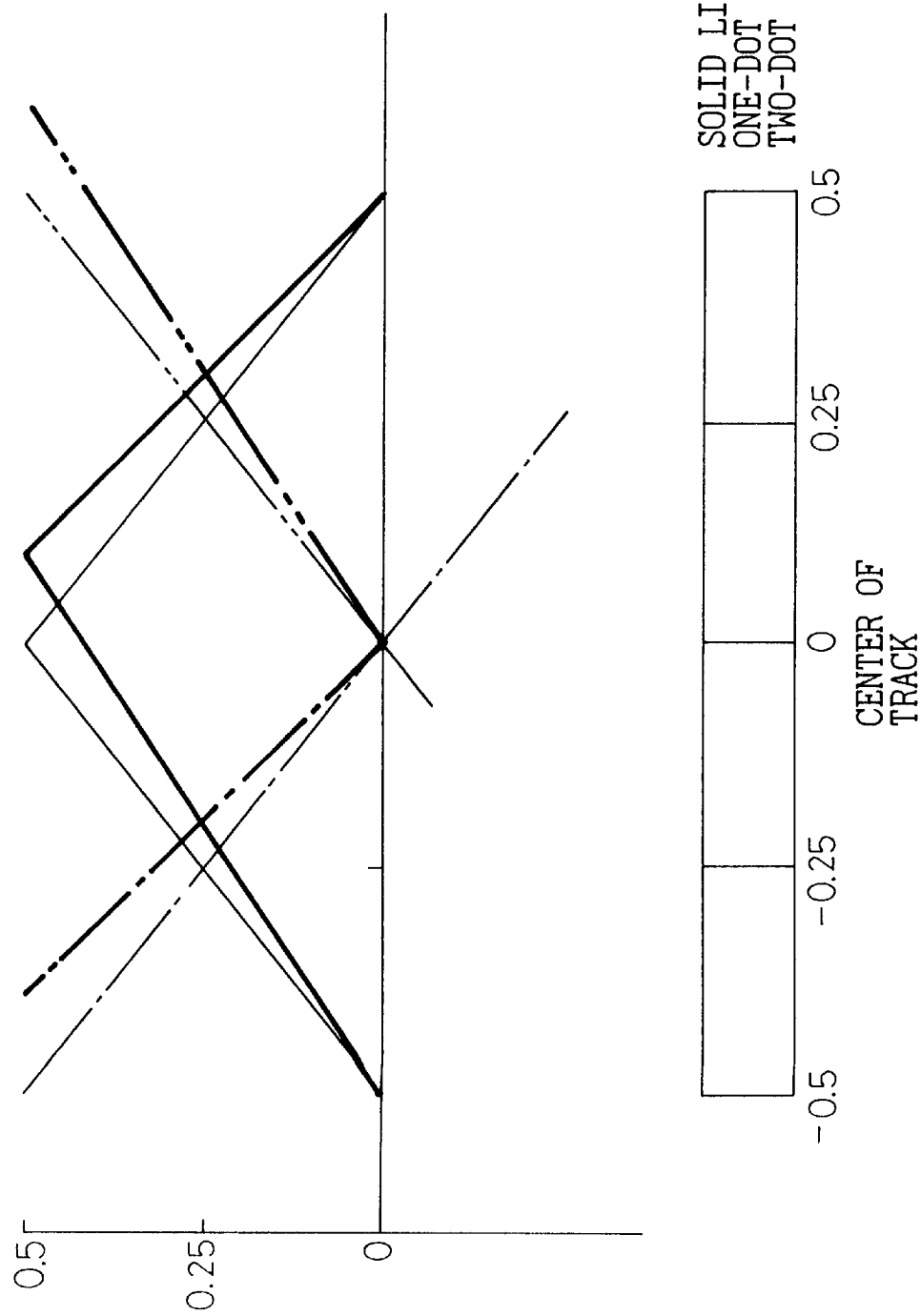
FIG. 22 illustrates the method for determining the gain.

FIG. 22 illustrates a method for determining the gain for the case where the track number is an odd number. The abscissa represents the width of the track with respect to the center of the track, and the ordinate represents the output of the head. The solid line represents the PosQ signal, the one point chain line represents the PosN signal, while the two point chain line represents the reversed signal of the PosN signal, in which the thick lines represent the output of the MR head, while the thin lines represent the ideal outputs.

Since the sensitivity of the MR head is different between the inner side and the outer side, the waveforms of the triangular wave signals PosQ, PosN, and –(PosN) are shifted from the ideal triangular waveform. In the apparatus according to the present invention, the sensitivity is calculated in the vicinity of the two locations offset by 0.25 track in the positive and the negative directions from the center of the track and the average value of the calculated sensitivities is adopted as the gain G, to avoid the effect of the shift from the ideal triangular waveform.

Figure 23:
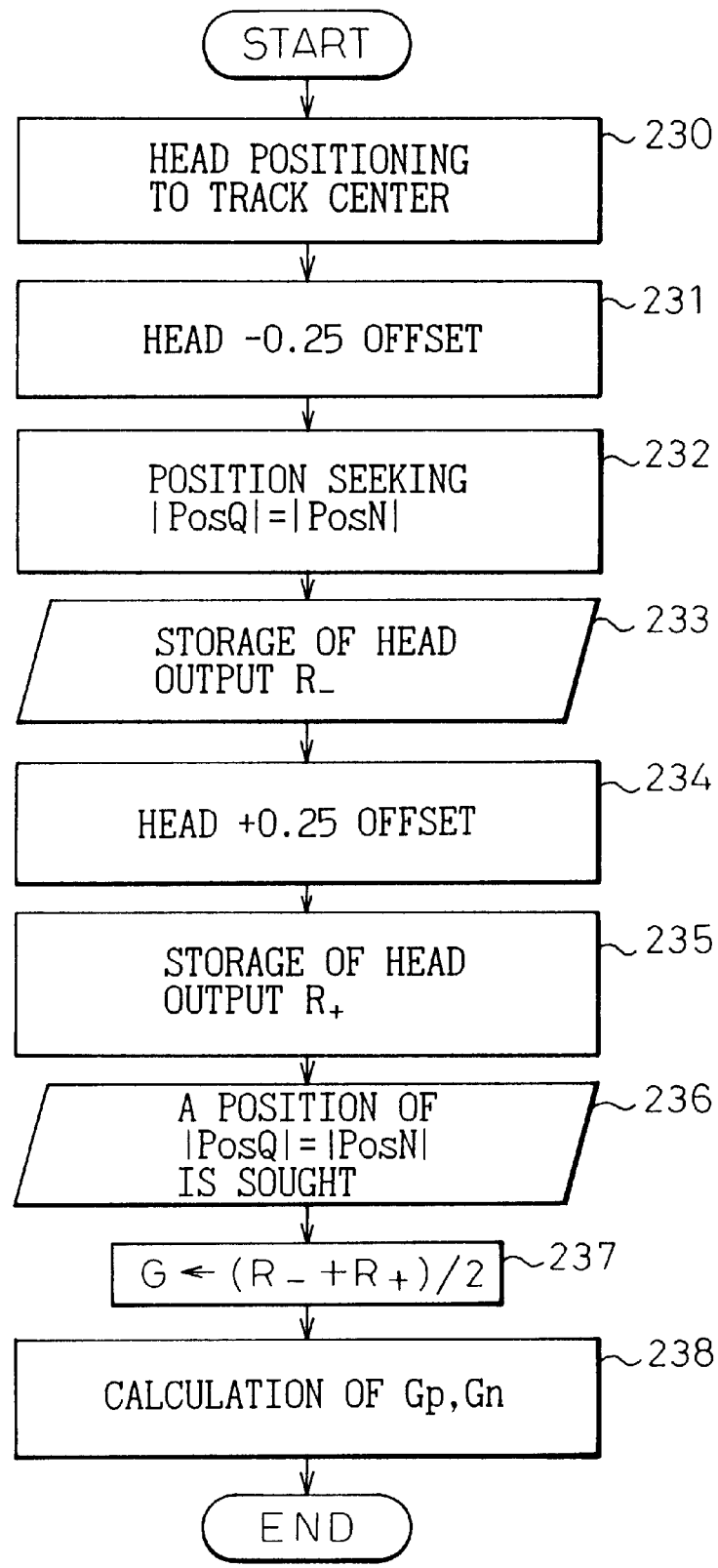
FIG. 23 shows a flow chart of the routine for determining the gain.

FIG. 23 shows a flowchart of the routine of the gain determination, in which the head 102 is positioned at the center of the track where the PosN crosses the zero. In step 231, the offset by –0.25 times of the track is carried out, and in step 232, the position of the head is adjusted so as to make the absolute values |PosQ| and |PosN| demodulated from the output of the MR head to be equal. When |PosQ| and |PosN| become equal within the maximum allowance, |PosQ| is stored as R(–) in step 233.

In step 234, the head 102 is offset by ±0.25 track from the center of the track, and in step 235, the head position is adjusted so as to make |PosQ| and |PosN| demodulated from the output of the MR head to be equal. When |PosQ| and |PosN| become equal within the maximum allowance, |PosQ| is stored as R(+) in step 236. In step 237, the gain G is calculated by the equation: G=(R(–)+R(+))/2. Then this routine is terminated.

Since the gain G calculated as above is the average of the above-mentioned positive side gain Gp and negative side gain Gn, the positive side gain Gp and the negative side gain Gn are calculated in step 238 as follows.

That is, since there are the relationships G=(Gp+Gn)/2 and Gr=Gp/Gn, it is established that: Gp=2·G·Gr/(Gr+1) and Gn=2·G/(Gr+1).

Thus, the positive side gain Gp and the negative side gain Gn when the MR head 102 is positioned at a predetermined track in accordance with the decodings shown in List 1 and List 2 are determined.

The above-mentioned routine of the gain determination constitutes a part of the head position signal generation portion 90 (see FIG. 9) and is executed simultaneously with the determination of the characteristic of the gain difference compensation. Also, it is possible to determine the gain G in the similar manner in the case of the track having an even track number.

As the algorithm for producing the head position signal in the head position signal generation portion 90, shown in FIG. 9, although the contents of List 1 and List 2 as they are can be used, it is also possible to use the algorithms which are simplified from them.

That is, it is possible to select the positive side gain Gp and the negative gain Gn based on the logic indicated below, by re-arranging the logic of List 1 and List 2, depending on whether the signal used for the synthesis of the head position signal Phd is PosQ or PosN.

(1) For synthesizing the head position signal Phd from PosQ, the positive side gain Gp is used for the case where PosQ*PosN is negative, while the negative side gain Gn is used for the case other than above.

(2) For synthesizing the head position signal Phd from PosN, the negative side gain Gn is used for the case where PosQ*PosN is negative, while the positive side gain Gp for the case other than above.

The program list for this logic is given in List 3.

---

List 3

```
if(abs(N) <= abs(Q)) {
        if(N*Q <= 0.0)
                Gain = G1;
        else
                Gain = G2;
        Position = -sgn(Q)*Gain*N + Track;
        if(sgn(Q)* even(Track) > 0)
                Position + =sgn(Q)*sgn(N)*1.0;
} else {
        if(N*Q <= 0.0)
                Gain = G2;
        else
                Gain = G1;
        Position = sgn(N)*(Gain*Q +
even(Track)*0.5) + Track;
```
The definitions of the symbols and the functions are as follows:
    Position . . . the produced position
    abs(x) . . . the absolute value of x
    sgn(x) . . . 1 for the case where x >= 0.0,
                  –1 for the case where x < 0
    even(x) . . . 1 for the case where x is even,
                  –1 for the case where x is odd

---

Figure 24:
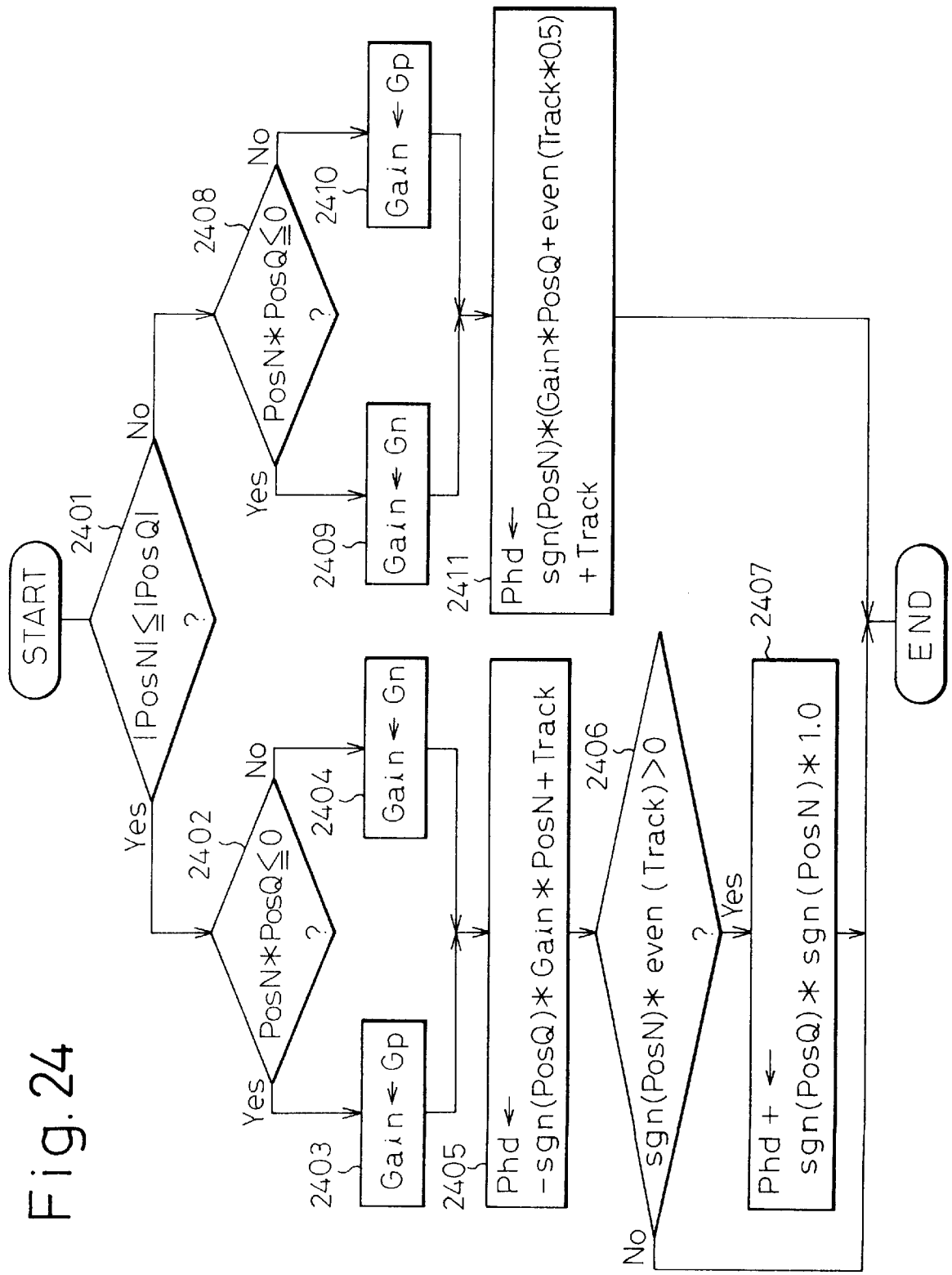
FIG. 24 shows a flow chart of the routine for producing the head position signal.

List 3 shows the program list in the C language of the routine for producing the head position signal, expressed in the C language, made based on the above mentioned logic, and FIG. 24 shows a flow chart of the routine for producing the head position signal. The process for producing the head position signal Phd will be described based on this flow chart. In the program list, shown in List 3, "Q" and "N" represent PosQ and PosN, respectively, and "Position" represents the head position signal Phd.

In step 2401, it is decided whether the absolute value of PosN is equal to or less than the absolute value of PosQ, i.e. whether PosN is nearer to the center of the amplitude than PosQ is.

When the decision in step 2401 is affirmative, i.e. in the case where the head position Phd is synthesized based on PosN signal, the process proceeds to step 2402 where it is decided whether PosQ*PosN is negative.

When the decision in step 2402 is affirmative, i.e. in the case where PosQ and PosN have difference signs, "Gain" is set to the positive side gain Gp in step 2403, and the process proceeds to step 2405. When the decision in step 2402 is negative, i.e. in the case where PosQ and PosN have the same sign, "Gain" is set to the negative side gain Gn, and the process proceeds to step 2405.

In step 2405, the head position signal Phd is synthesized based on PosN in accordance with the equation: Phd=sng (PosQ)*Gain*PosN+Track. In this equation, "sng( )" represents a function to derive the sign of the variable in the parenthesis to give the value 1 when the variable is positive, while the value 0 when the variable is negative.

In step 2406, it is decided whether or not the erroneous reading of the track number "Track" occurs by deciding whether or not sng(PosQ)*even(Track) is positive. The indication "even( )" represents a function to decide whether the variable in the parenthesis is even or odd to give the value 1 when the variable is an even number, while the value –1 when the variable is an odd number.

When the decision in step 2406 is affirmative, i.e. it is decided that the track number is erroneously read, the track number is modified by ±1 in accordance with the equation: Phd=Phd+sng(PosQ)*sng(PosN)* 1.0, and accordingly the correct head position signal Phd is synthesized, and then this routine is terminated. In this equation, the multiplication by 1.0 is carried out for transforming the integer sng(PosQ)*sng(PosN) to a real number.

When the decision in step 2406 is negative, i.e. no erroneous reading of the track number occurs, this routine is directly terminated.

Contrary to the above, when the decision in step 2401 is negative, i.e. the head position signal is synthesized based on PosN, the process proceeds to step 2408 where it is decided whether or not PosQ*PosN is negative.

When the decision in step 2408 is affirmative, "Gain" is set to the negative side gain Gn in step 2409, and the process proceeds to step 2411. When the decision in step 2408 is negative, "Gain" is set to the positive side gain Gp in step 2410, and the process proceeds to step 2411.

In step 2411, the head position signal Phd is synthesized in accordance with the equation: Phd=sng(PosN)*(Gain*PosQ+even(Track)*0.5)+Track.

The above-mentioned head position signal generation routine constitutes a part of the head position generation portion 90, shown in FIG. 9, and is executed each time the head is positioned.

Hereinbefore, the case where the MR head was positioned at the center of the track when the data was read from the magnetic storage device was described.

Since the MR head is used only for the reading, as described hereinbefore, an inductive head separated from the MR head is used for writing the data. Therefore, for positioning the inductive head to the center of the track during the writing of the data, it is necessary to position the MR head at the position offset from the center of the track.

Also, for compensating the positioning error cause by the fact that the locus of the movement of the head driven by the VCM is not a straight line but an arc of a circle, it is necessary to position the MR head at the center of the track during the writing of the data, while at the position offset from the center of the track during the reading of the data.

It will be obvious that, in the case where the MR head is positioned at the position offset from the center of the track, it is possible to apply the technique of the present invention by offsetting the target position Ptg generated in the target position generation portion 91.

Although the present invention has been described based on the above-described embodiments, it is possible to modify the embodiments substantially within the scope of the invention defined by the claims.

In the apparatus according to the first aspect of the present invention, with regard to a magnetic storage device which uses a head such as an MR head having the gain of the reading which is different in the inner side and the outer side of the head, the multiplications by different gains are carried out for the case where the position control signal is positive and the case where the position control signal is negative, and hence the difference in the gains is compensated, so that the precision of the positioning of the head can be enhanced.

In the apparatus according to the second aspect of the present invention, with regard to an apparatus for positioning the head for a magnetic storage device, the linearity of the characteristic of the output of the head can be improved by carrying out an arc-sine functional transformation of the position control signal after the compensation.

In the apparatus according to the third aspect of the present invention, with regard to an apparatus for positioning the head for a magnetic storage device, the gain difference compensation characteristic can be changed for each predetermined timing while the magnetic storage device is used, and hence the precision of the positioning of the head, even if the characteristic of the reading by the head is changed with time, can be maintained.

In the apparatus according to the fourth aspect of the present invention, the characteristic of the compensation for the gain difference can be measured during the production of the magnetic storage device.

What is claimed is:

1. An apparatus for positioning a head of a magnetic storage device comprising:

a head for recording data on a medium for storage and reading data recorded on said medium for storage;

head position signal synthesis means for generating two triangular waves having a 90° phase difference from each other by reading and demodulating a burst pattern recorded on the medium and synthesizing a head position signal using an absolute value of an amplitude of one of said two triangular waves;

head position control means for generating a head position control signal based on the head position signal synthesized by said head position signal synthesis means and a target head position;

gain difference compensation means for generating a compensation head position signal by multiplying the head position signal generated in said head position control means by a coefficient which assumes a first value when a product of the two triangular wave amplitudes is positive and a second value when said product is negative; and head positioning means for positioning said head at the target position on the medium for storage based on the compensation control signal generated in said gain difference compensation means.

2. An apparatus according to claim 1, further comprising arc-sine function transformation means, between said gain difference compensation means and said head positioning means, for arc-sine function transforming the compensation head position control signal.

3. An apparatus according to claims 1 or 2, wherein said head position signal synthesis means comprises gain calculation means for calculating a gain for converting the two triangular waves to a track quadrant position based on an average of the absolute values of the triangular wave amplitudes at a point on a preceding side and a point on a following side of a zero crossing point of the two triangular waves, where the absolute values of the two triangular waves are equal.

4. An apparatus according to claim 3, further comprising compensation characteristic determination means for changing, in a sine wave manner, a selected said triangular wave at each predetermined timing whose amplitude has a smaller amplitude than a remaining said triangular wave, and determining the compensation characteristic of said gain difference compensation means so that one of a positive/negative peak ratio, representing an absolute value of a ratio of positive to negative peak values of said selected triangular wave, and a positive/negative area ratio, representing an absolute value of a ratio of areas surround positive and negative peak values of said selected triangular wave, is within a specified range during each said predetermined timing.

5. An apparatus according to claims 1 or 2, further comprising compensation characteristic determination means for changing, in a sine wave manner at each predetermined timing, a selected said triangular wave whose amplitude has a smaller amplitude than a remaining said triangular wave, and determining the compensation characteristic of said gain difference compensation means so that one of a positive/negative peak ratio, representing an absolute value of a ratio of positive to negative peak values of said selected triangular wave, and a positive/negative area ratio, representing an absolute value of a ratio of areas surrounding positive and negative peak values of said selected triangular wave, is within a specified range during each said predetermined timing.

6. An apparatus according to claim 5, wherein said compensation characteristic determination means determines the compensation characteristic each time the power source of the magnetic storage device is switched on.

7. An apparatus according to claim 5, wherein said compensation characteristic determination means determines the compensation characteristic each time the time of operation of the magnetic storage device has exceeded a predetermined standard time length.

8. An apparatus according to claim 5, wherein said compensation characteristic determination means determines the compensation characteristic each time the reading errors of the magnetic storage device have occurred at times more than a predetermined standard times.

9. An apparatus according to claim 5, wherein said compensation characteristic determination means determines the compensation characteristic each time the writing errors of the magnetic storage device have occurred more times than a predetermined standard number of times.

10. An apparatus according to claim 1, wherein said head comprises separately a writing head for recording data in the medium for recording and a reading head for reading the data recorded on said medium for recording.

11. An apparatus according to claim 10, wherein said reading head is a magnetoresistive (MR) head.

12. An apparatus according to claim 10, wherein said head positioning means positions said reading head at a center of the track or a position offset from the center of the track.

13. An apparatus according to claim 1, wherein the gain difference compensation characteristic is determined by using information read by said head after said servo burst pattern is recorded by a servo track writer.

* * * * *

UNITED STATES PATENT AND TRADEMARK OFFICE
CERTIFICATE OF CORRECTION

PATENT NO. : 6,118,615
DATED : September 12, 2000
INVENTOR(S) : Takaishi

It is certified that error appears in the above-identified patent and that said Letters Patent is hereby corrected as shown below:

Claim 4,
Line 50, delete "waves" and insert -- amplitude -- therefore.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*